United States Patent
Kim

(10) Patent No.: US 7,630,350 B2
(45) Date of Patent: *Dec. 8, 2009

(54) METHOD AND SYSTEM FOR PARSING BITS IN AN INTERLEAVER FOR ADAPTIVE MODULATIONS IN A MULTIPLE INPUT MULTIPLE OUTPUT (MIMO) WIRELESS LOCAL AREA NETWORK (WLAN) SYSTEM

(75) Inventor: Joonsuk Kim, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 556 days.

This patent is subject to a terminal disclaimer.

(21) Appl. No.: 11/183,018

(22) Filed: Jul. 14, 2005

(65) Prior Publication Data

US 2006/0274687 A1    Dec. 7, 2006

Related U.S. Application Data

(63) Continuation-in-part of application No. 11/146,394, filed on Jun. 6, 2005.

(51) Int. Cl.
   *H04W 4/00*    (2009.01)
(52) U.S. Cl. .................. 370/338; 370/334; 370/328; 370/343
(58) Field of Classification Search ............... 370/328, 370/338, 310, 341, 252, 334, 343, 431, 464; 375/60, 261, 267, 262, 265; 700/53; 714/755, 714/790, 781, 788, 756; 455/69, 101, 103
See application file for complete search history.

(56) References Cited

U.S. PATENT DOCUMENTS

| 6,304,991 B1 * | 10/2001 | Rowitch et al. ............ 714/755 |
|---|---|---|
| 6,952,454 B1 * | 10/2005 | Jalali et al. ............... 375/260 |
| 6,961,388 B2 * | 11/2005 | Ling et al. ................ 375/267 |
| 2002/0133781 A1 * | 9/2002 | Mikkola et al. ........... 714/790 |
| 2002/0154705 A1 * | 10/2002 | Walton et al. ............. 375/267 |
| 2003/0103584 A1 * | 6/2003 | Bjerke et al. ............. 375/340 |
| 2004/0082356 A1 * | 4/2004 | Walton et al. ............. 455/522 |
| 2004/0184398 A1 * | 9/2004 | Walton et al. ............. 370/203 |
| 2005/0058217 A1 * | 3/2005 | Sandhu et al. ............ 375/267 |
| 2005/0135493 A1 * | 6/2005 | Maltsev et al. ............ 375/260 |
| 2005/0147076 A1 * | 7/2005 | Sadowsky et al. ......... 370/343 |
| 2005/0152466 A1 * | 7/2005 | Maltsev et al. ............ 375/260 |
| 2005/0220199 A1 * | 10/2005 | Sadowsky et al. ......... 375/260 |

(Continued)

OTHER PUBLICATIONS

Mujtaba, "TGn Sync Proposal Technical Specification," Jan. 18, 2005, pp. 1-136.

(Continued)

*Primary Examiner*—Kamran Afshar
(74) *Attorney, Agent, or Firm*—McAndrews, Held & Malloy

(57) ABSTRACT

Aspects of a method and system for parsing bits in an interleaver for adaptive modulations in a multiple input multiple output (MIMO) wireless local area network (WLAN) system are provided. The interleaver may generate a lookup table, which is utilized to assign at least one binary bit of information, among a plurality of binary bits of information to be transmitted, to at least one of a plurality of spatial streams. The lookup table may be utilized to assign binary bits of information among the plurality of spatial streams to improve performance of a MIMO transceiver.

30 Claims, 12 Drawing Sheets

U.S. PATENT DOCUMENTS

| | | | |
|---|---|---|---|
| 2005/0287978 A1* | 12/2005 | Maltsev et al. | 455/403 |
| 2006/0002486 A1* | 1/2006 | van Nee | 375/260 |
| 2006/0036924 A1* | 2/2006 | Ghosh | 714/755 |
| 2006/0067411 A1* | 3/2006 | Sandhu | 375/260 |
| 2006/0104377 A1* | 5/2006 | Chimitt et al. | 375/261 |
| 2006/0156087 A1* | 7/2006 | Lin et al. | 714/713 |
| 2006/0159120 A1* | 7/2006 | Klm | 370/465 |
| 2006/0176972 A1* | 8/2006 | Kim et al. | 375/267 |
| 2006/0203836 A1* | 9/2006 | Kim | 370/431 |
| 2006/0227892 A1* | 10/2006 | Ouyang et al. | 375/267 |

OTHER PUBLICATIONS

Hansen, et al., "WWiSE Proposal: High Throughout Extension to the 802.11 Standard," Dec. 20, 2004.

* cited by examiner

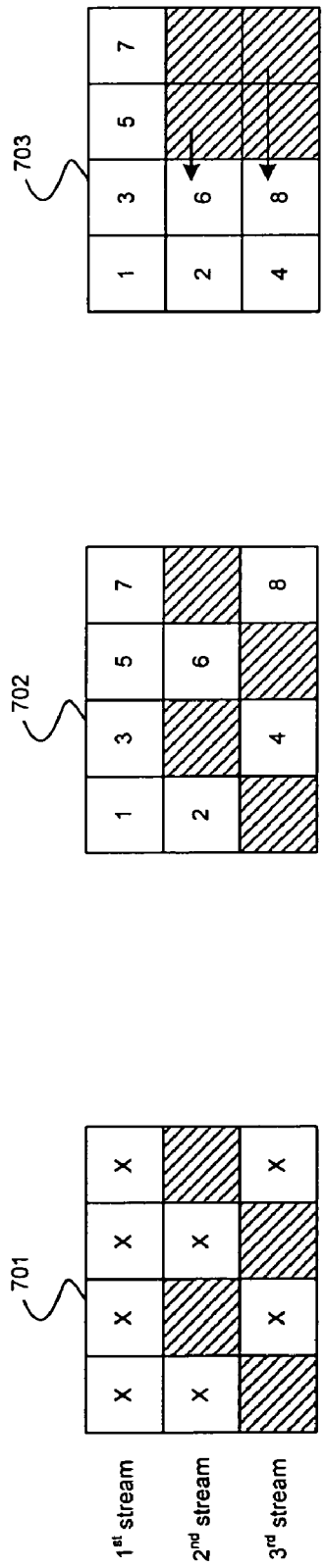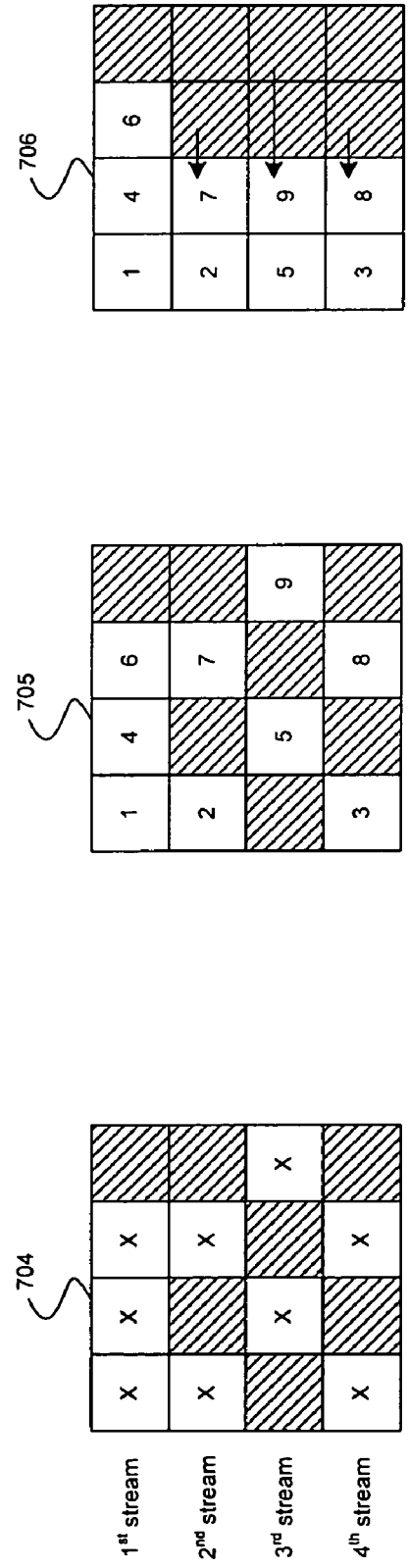
FIG. 7a
FIG. 7b

ODE AND SYSTEM FOR PARSING BITS
IN AN INTERLEAVER FOR ADAPTIVE
MODULATIONS IN A MULTIPLE INPUT
MULTIPLE OUTPUT (MIMO) WIRELESS
LOCAL AREA NETWORK (WLAN) SYSTEM

CROSS-REFERENCE TO RELATED APPLICATIONS/INCORPORATION BY REFERENCE

This application is a continuation-in-part of U.S. patent application Ser. No. 11/146,394 filed Jun. 6, 2005.

This application makes reference to:

U.S. patent application Ser. No. 11/061,567 filed Feb. 18, 2005;

U.S. patent application Ser. No. 11/052,389 filed Feb. 7, 2005;

U.S. patent application Ser. No. 11/052,353 filed Feb. 7, 2005; and

U.S. patent application Ser. No. 11/110,241 filed Apr. 20, 2005.

All of the above stated applications are hereby incorporated herein by reference in their entirety.

FIELD OF THE INVENTION

Certain embodiments of the invention relate to wireless communication. More specifically, certain embodiments of the invention relate to a method and system for parsing bits in an interleaver for adaptive modulations in a multiple input multiple output (MIMO) wireless local area network (WLAN) system.

BACKGROUND OF THE INVENTION

The Institute for Electrical and Electronics Engineers (IEEE), in resolution IEEE 802.11, also referred as "802.11", has defined a plurality of specifications which are related to wireless networking. With current existing 802.11 standards, such as 802.11(a),(b),(g), which can support up to 54 Mbps data rates, either in 2.4 GHz or in 5 GHz frequency bands, the IEEE standards body created a new task group, 802.11n, to support higher than 100 Mbps data rates. Among them, specifications for "closed loop" feedback mechanisms are being discussed by which a receiving station may feed back information to a transmitting station to assist the transmitting station in adapting signals that are to be sent to the receiving station.

In closed loop feedback systems, a transmitting station may utilize feedback information from a receiving station to transmit subsequent signals in what is called "beamforming". Beamforming is a technique to steer signals to a certain direction for the receiver to receive it more reliably with less noise and interference. Compounded with demands for new features and capabilities, various proposals for new 802.11n based feedback mechanisms are emerging to address the demand for these new features and capabilities. For example, there exists a demand for the introduction of new capabilities, which may enable a receiving mobile terminal to feedback pertinent information to a transmitting mobile terminal. This feedback of pertinent information may enable the transmitting mobile terminal to adapt its mode of transmission based upon the feedback information provided by the receiving mobile terminal. As with any communication system, a major goal is to enable the transmitting mobile station to achieve a higher information transfer rate to the receiving mobile terminal, while simultaneously achieving a lower packet error rate (PER). Notwithstanding, there are no existing methodologies that adequately address these shortcomings and/or satisfy the demand for these new features and capabilities in WLANs.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for parsing bits in an interleaver for adaptive modulations in a multiple input multiple output (MIMO) wireless local area network (WLAN) system, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 7a is a diagram illustrating generation of an exemplary lookup table comprising 3 spatial streams, in accordance with an embodiment of the invention.

FIG. 7b is a diagram illustrating generation of an exemplary lookup table comprising 4 spatial streams, in accordance with an embodiment of the invention.

DETAILED DESCRIPTION OF THE INVENTION

Figure 1:
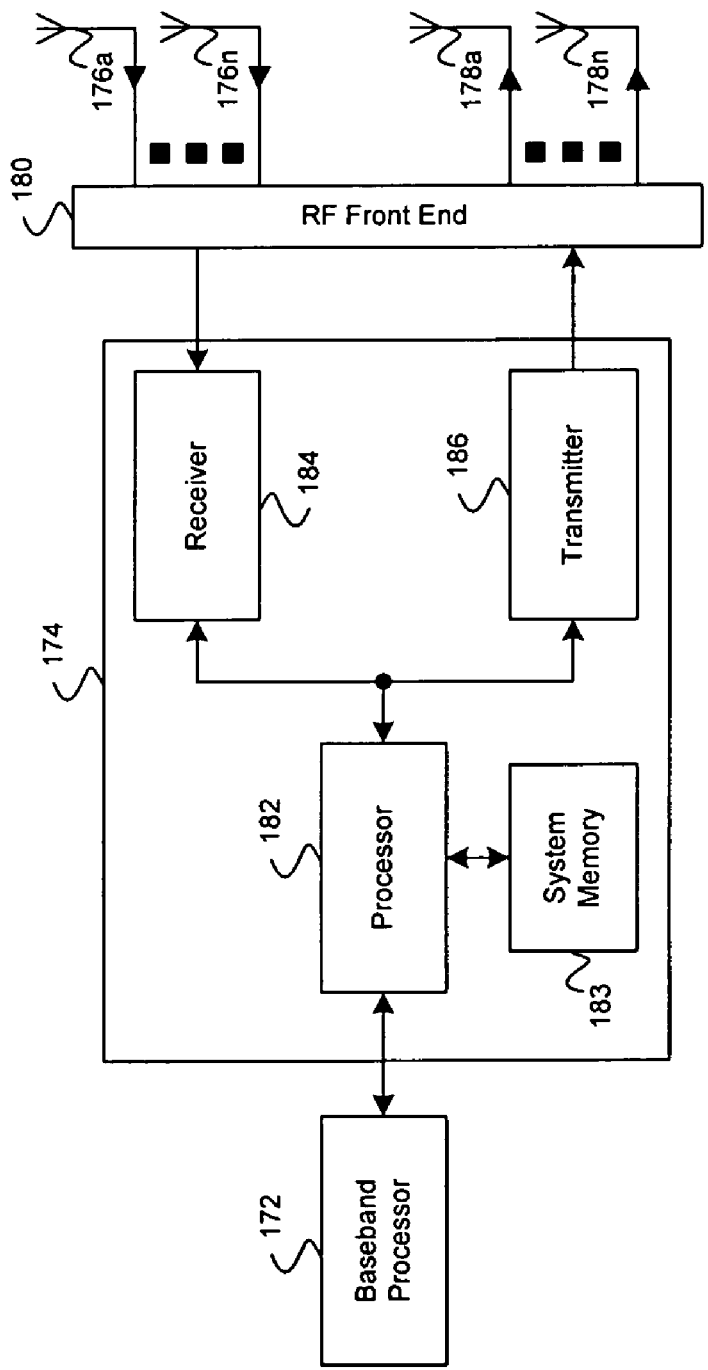
FIG. 1 is a block diagram of exemplary communications circuitry that may be utilized in connection with an embodiment of the invention.

Certain embodiments of the invention relate to a method and system for parsing bits in an interleaver for adaptive modulations in a multiple input multiple output (MIMO) wireless local area network (WLAN) system. An interleaver may assign, to one of a plurality of spatial streams, binary bits of information to be transmitted wirelessly via at least one of the plurality of spatial streams. Each of the plurality of spatial streams may be utilized, in a MIMO system, to communicate information wirelessly between a transmitter and receiver. A spatial stream may comprise a plurality of carrier frequencies that are utilized, in connection with a modulation type, to transmit information wirelessly. A number of bits assigned to a carrier frequency among a plurality of carrier frequencies associated with a spatial stream may be based on a modulation type utilized in connection with the spatial stream.

A MIMO system, in which a modulation type utilized in connection with one spatial stream is different from a modulation type utilized in a subsequent one of the spatial streams, may utilize adaptive modulation. In a MIMO system that utilizes adaptive modulations, a number of binary bits assigned to a spatial stream may differ from a number of binary bits assigned to a subsequent spatial stream. Various embodiments of the invention may comprise an interleaver that utilizes a method for assigning binary bits that results in improved communications performance in MIMO systems, as measured by criteria such as signal to noise ratio (SNR) and packet error rate (PER), when compared to interleavers that utilize other methods. Various embodiments of the invention may comprise a deinterleaver that utilizes a method, corresponding to the method utilized by the interleaver, for receiving binary bits of received information via at least one of a plurality of spatial streams.

With interleavers utilized in some conventional MIMO systems, a number of bits of binary information that are assigned to one of the plurality of spatial streams may be equal to a number of bits that are assigned to each subsequent one of the plurality of spatial streams. In these conventional MIMO systems, a modulation type utilized in one of the plurality of spatial streams may be equivalent to a subsequent modulation type utilized in each subsequent one of the plurality of spatial streams. A modulation type may be equivalent to a subsequent modulation type if data encoded utilizing the modulation type, and the same data encoded utilizing the subsequent modulation type, may be decoded by utilizing substantially identical processing steps to produce the data, in the absence of errors.

Various embodiments of the invention may comprise a MIMO system that utilizes an interleaver that enables a modulation type to be adaptively determined for one of a plurality of spatial streams. A modulation type may be adaptively determined among a plurality of spatial streams if a modulation type utilized in one of the plurality of spatial streams is not equivalent to a subsequent modulation type utilized in each subsequent one of the plurality of spatial streams. With interleavers utilized in various embodiments of the invention, a number of bits of binary information that are assigned to one of the plurality of spatial streams may not be equal to a number of bits that are assigned to at least one of a subsequent one of the plurality of spatial streams.

FIG. 1 is a block diagram of exemplary communications circuitry that may be utilized in connection with an embodiment of the invention. With reference to FIG. 1 there is shown a baseband processor 172, a transceiver 174, an RF front end 180, a plurality of receive antennas 176a, . . . , 176n, and a plurality of transmitting antennas 178a, . . . , 178n. The transceiver 174 may comprise a processor 182, system memory 183, a receiver 184, and a transmitter 286.

The processor 182 may be adapted to perform digital receiver and/or transmitter functions in accordance with applicable communications standards. These functions may comprise, but are not limited to, tasks performed at lower layers in a relevant protocol reference model. These tasks may further comprise the physical layer convergence procedure (PLCP), physical medium dependent (PMD) functions, and associated layer management functions. The system memory 183 may comprise suitable logic, circuitry, and/or code to be utilized to store, or write, and retrieve, or read, information. It may comprise a plurality of memory technologies such as random access memory (RAM). The baseband processor 172 may be adapted to perform functions in accordance with applicable communications standards. These functions may comprise, but are not limited to, tasks related to analysis of data received via the receiver 184, and tasks related to generating data to be transmitted via the transmitter 186. These tasks may further comprise medium access control (MAC) layer functions as specified by pertinent standards.

The receiver 184 may be adapted to perform digital receiver functions that may comprise, but are not limited to, fast Fourier transform processing, beamforming processing, equalization, demapping, demodulation control, deinterleaving, depuncture, and decoding. The transmitter 186 may perform digital transmitter functions that comprise, but are not limited to, coding, puncture, interleaving, mapping, modulation control, inverse fast Fourier transform processing, beamforming processing. The RF front end 180 may receive analog RF signals via antennas 176a, . . . , 176n, converting the RF signal to baseband and generating a digital equivalent of the received analog baseband signal. The digital representation may be a complex quantity comprising I and Q components. The RF front end 180 may also transmit analog RF signals via an antenna 178a, . . . , 178n, converting a digital baseband signal to an analog RF signal.

In operation, the processor 182 may receive data from the receiver 184. The processor 182 may communicate received data to the baseband processor 172 for analysis and further processing. The baseband processor 172 may generate data to be transmitted via an RF channel by the transmitter 186. The baseband processor 172 may communicate the data to the processor 182. The processor 182 may generate a plurality of bits that are communicated to the receiver 184. The processor 182 may generate signals to control the operation of the modulation process in the transmitter 186, and of the demodulation process in the receiver 184.

Figure 2:
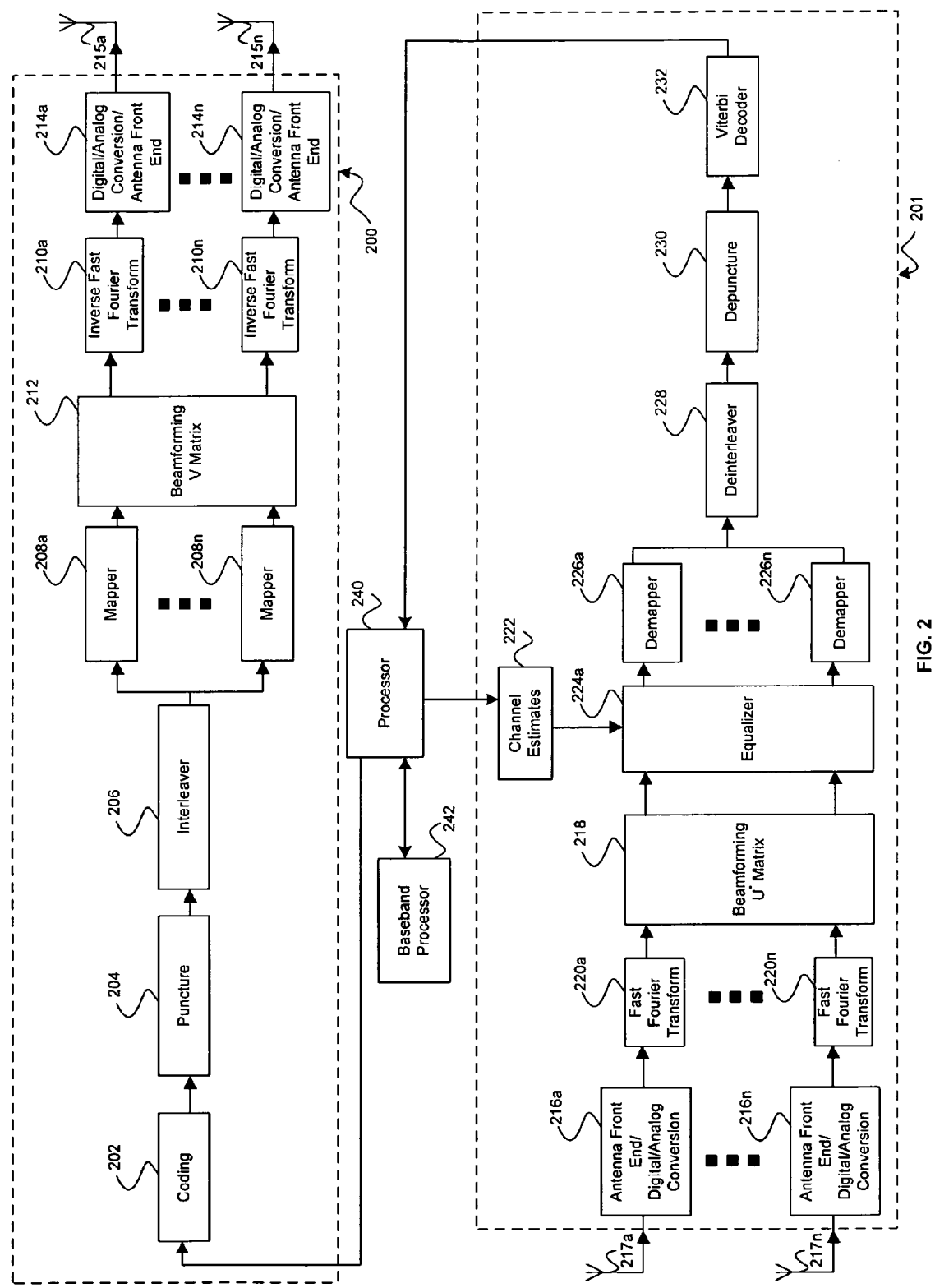
FIG. 2 is a block diagram of an exemplary transceiver comprising a transmitter and a receiver in a MIMO system, which may be utilized in connection with an embodiment of the invention.

FIG. 2 is a block diagram of an exemplary transceiver comprising a transmitter and a receiver in a MIMO system, which may be utilized in connection with an embodiment of the invention. FIG. 2 shows a transceiver comprising a transmitter 200, a receiver 201, a processor 240, a baseband processor 242, a plurality of transmitter antennas 215a, . . . , 215n, and a plurality of receiver antennas 217a, . . . , 217n. The transmitter 200 may comprise a coding block 202, a puncture block 204, an interleaver block 206, a plurality of mapper blocks 208a, . . . , 208n, a plurality of inverse fast Fourier transform (IFFT) blocks 210a, . . . , 210n, a beamforming V matrix block 212, and a plurality of digital to analog (D to A) conversion and antenna front end blocks 214a, . . . , 214n. The receiver 201 may comprise a plurality of antenna front end and analog to digital (A to D) conversion blocks 216a, ..., 216n, a beamforming U* matrix block 218, a plurality of fast Fourier transform (FFT) blocks 220a, ..., 220n, a channel estimates block 222, an equalizer block 224, a plurality of demapper blocks 226a, ..., 226n, a deinterleaver block 228, a depuncture block 230, and a Viterbi decoder block 232.

The variables V and U* in beamforming blocks 212 and 218 respectively refer to matrices utilized in the beamforming technique. U.S. application Ser. No. 11/052,389 filed Feb. 7, 2005, provides a detailed description of Eigenbeamforming, which application is hereby incorporated herein by reference in its entirety.

The processor 240 may perform digital receiver and/or transmitter functions in accordance with applicable communications standards. These functions may comprise, but are not limited to, tasks performed at lower layers in a relevant protocol reference model. These tasks may further comprise the physical layer convergence procedure (PLCP), physical medium dependent (PMD) functions, and associated layer management functions. The baseband processor 242 may similarly perform functions in accordance with applicable communications standards. These functions may comprise, but are not limited to, tasks related to analysis of data received via the receiver 201, and tasks related to generating data to be transmitted via the transmitter 200. These tasks may further comprise medium access control (MAC) layer functions as specified by pertinent standards.

In the transmitter 200, the coding block 202 may transform received binary input data blocks by applying a forward error correction (FEC) technique, for example, binary convolutional coding (BCC). The application of FEC techniques, also known as "channel coding", may improve the ability to successfully recover transmitted data at a receiver by appending redundant information to the input data prior to transmission via an RF channel. The ratio of the number of bits in the binary input data block to the number of bits in the transformed data block may be known as the "coding rate". The coding rate may be specified using the notation $i_b/t_b$, where $t_b$ represents the total number of bits that comprise a coding group of bits, while $i_b$ represents the number of information bits that are contained in the group of bits $t_b$. Any number of bits $t_b - i_b$ may represent redundant bits that may enable the receiver 201 to detect and correct errors introduced during transmission. Increasing the number of redundant bits may enable greater capabilities at the receiver to detect and correct errors in information bits. The invention is not limited to BCC, and any one of a plurality of coding techniques, for example, Turbo coding or low density parity check (LDPC) coding, may also be utilized.

The puncture block 204 may receive transformed binary input data blocks from the coding block 202 and alter the coding rate by removing redundant bits from the received transformed binary input data blocks. For example, if the coding block 202 implemented a ½ coding rate, 4 bits of data received from the coding block 202 may comprise 2 information bits, and 2 redundant bits. By eliminating 1 of the redundant bits in the group of 4 bits, the puncture block 204 may adapt the coding rate from ½ to ⅔. The interleaver block 206 may rearrange bits received in a coding rate-adapted data block from the puncture block 204 prior to transmission via an RF channel to reduce the probability of uncorrectable corruption of data due to burst of errors, impacting contiguous bits, during transmission via an RF channel. The output from the interleaver block 206 may also be divided into a plurality of streams where each stream may comprise a non-overlapping portion of the bits from the received coding rate-adapted data block. Therefore, for a given number of bits in the coding rate-adapted data block, $b_{db}$, a given number of streams from the interleaver block 206, $n_{st}$, and a given number of bits assigned to an individual stream i by the interleaver block 206, $b_{st}(i)$:

$$b_{db} = \sum_{i=0}^{n_{st}-1} b_{st}(i) \qquad \text{equation [1]}$$

The plurality of mapper blocks 208a, ..., 208n may comprise a number of individual mapper blocks that is equal to the number of individual streams generated by the interleaver block 206. Each individual mapper block 208a, ..., 208n may receive a plurality of bits from a corresponding individual stream, mapping those bits into a "symbol" by applying a modulation technique based on a "constellation" utilized to transform the plurality of bits into a signal level representing the symbol. The representation of the symbol may be a complex quantity comprising in-phase (I) and quadrature (Q) components. The mapper block 208a, ..., 208n for stream i may utilize a modulation technique to map a plurality of bits, $b_{st}(i)$, into a symbol.

The beamforming V matrix block 212 may apply the beamforming technique to the plurality of symbols, or "spatial modes", generated from the plurality of mapper blocks 208a, ..., 208n. The beamforming V matrix block 212 may generate a plurality of signals where the number of signals generated may be equal to the number of transmitting antenna at the transmitter 200. Each signal in the plurality of signals generated by the beamforming V block 112 may comprise a weighted sum of at least one of the received symbols from the mapper blocks 208a, ..., 208n.

The plurality of IFFT blocks 210a, ..., 210n may receive a plurality of signals from the beamforming block 212. Each IFFT block 210a, ..., 210n may subdivide the bandwidth of the RF channel into a plurality of n sub-band frequencies to implement orthogonal frequency division multiplexing (OFDM), and buffer a plurality of received signals equal to the number of sub-bands. Each buffered signal may be modulated by a carrier signal whose frequency is based on that of one of the sub-bands. Each of the IFFT blocks 210a, ..., 210n may then independently sum their respective buffered and modulated signals across the frequency sub-bands to perform an n-point IFFT thereby generating a composite OFDM signal.

The plurality of digital (D) to analog (A) conversion and antenna front end blocks 214a, ..., 214n may receive the plurality of signals generated by the plurality of IFFT blocks 210a, ..., 210n. The digital signal representation received from each of the plurality of IFFT blocks 210a, ..., 210n may be converted to an analog RF signal that may be amplified and transmitted via an antenna. The plurality of D to A conversion and antenna front end blocks 214a, ..., 214n may be equal to the number of transmitting antenna 215a, ..., 215n. Each D to A conversion and antenna front end block 214a, ..., 214n may receive one of the plurality of signals from the beamforming V matrix block 212 and may utilize an antenna 215a, ..., 215n to transmit one RF signal via an RF channel.

In the receiver 201, the plurality of antenna front end and A to D conversion blocks 216a, ..., 216n may receive analog RF signals via an antenna, converting the RF signal to baseband and generating a digital equivalent of the received analog baseband signal. The digital representation may be a complex quantity comprising I and Q components. The number of antenna front end and A to D conversion blocks 216a, . . . , 216n may be equal to the number of receiving antenna 217a, . . . , 217n.

The plurality of FFT blocks 220a, . . . , 220n may receive a plurality of signals from the plurality of antenna front end and A to D conversion blocks 216a, . . . , 216n. The plurality of FFT blocks 220a, . . . , 220n may be equal to the number of antenna front end and A to D conversion blocks 216a, . . . , 216n. Each FFT block 220a, . . . , 220n may receive a signal from an antenna front end and A to D conversion block 216a, . . . , 216n, independently applying an n-point FFT technique, and demodulating the signal by a utilizing a plurality of carrier signals based on the n sub-band frequencies utilized in the transmitter 200. The demodulated signals may be mathematically integrated over one sub band frequency period by each of the plurality of FFT blocks 220a, . . . , 220n to extract n symbols contained in each of the plurality of OFDM signals received by the receiver 201.

The beamforming U* block 218 may apply the beamforming technique to the plurality of signals received from the plurality of FFT blocks 220a, . . . , 220n. The beamforming U* block 218 may generate a plurality of signals where the number of signals generated may be equal to the number of spatial streams utilized in generating the signals at the transmitter 200. Each of the plurality of signals generated by the beamforming U* block 218 may comprise a weighted sum of at least one of the signals received from the FFT blocks 220a, . . . , 220n.

The channel estimates block 222 may utilize preamble information, contained in a received RF signal, to compute channel estimates. The equalizer block 224 may receive signals generated by the beamforming U* block 218. The equalizer block 224 may process the received signals based on input from the channel estimates block 222 to recover the symbol originally generated by the transmitter 200. The equalizer block 224 may comprise suitable logic, circuitry, and/or code that may be adapted to transform symbols received from the beamforming U* block 218 to compensate for fading in the RF channel.

The plurality of demapper blocks 226a, . . . , 226n may receive symbols from the equalizer block 224, reverse mapping each symbol to one or more binary bits by applying a demodulation technique, based on the modulation technique utilized in generating the symbol at the transmitter 200. The plurality of demapper blocks 226a, . . . , 226n may be equal to the number of streams in the transmitter 200.

The deinterleaver block 228 may receive a plurality of bits from each of the demapper blocks 226a, . . . , 226n, rearranging the order of bits among the received plurality of bits. The deinterleaver block 228 may rearrange the order of bits from the plurality of demapper blocks 226a, . . . , 226n in, for example, the reverse order of that utilized by the interleaver 206 in the transmitter 200. The depuncture block 230 may insert "null" bits into the output data block received from the deinterleaver block 228 that were removed by the puncture block 204. The Viterbi decoder block 232 may decode a depunctured output data block, applying a decoding technique that may recover the binary data blocks that were input to the coding block 202.

In operation, the processor 240 may receive decoded data from the Viterbi decoder 232. The processor 240 may communicate received data to the baseband processor 242 for analysis and further processing. The processor 240 may also communicate data received via the RF channel, by the receiver 201, to the channel estimates block 222. This information may be utilized by the channel estimates block 222, in the receiver 201, to compute channel estimates for a received RF channel. The baseband processor 242 may generate data to be transmitted via an RF channel by the transmitter 200. The baseband processor 242 may communicate the data to the processor 240. The processor 240 may generate a plurality of bits that are communicated to the coding block 202.

The elements shown in FIG. 2 may comprise components that may be present in an exemplary wireless communications terminal. One exemplary wireless communications terminal may be a wireless communications transmitter comprising a transmitter 200, a processor 240, and a baseband processor 242. Another exemplary wireless communications terminal may be a wireless communications receiver comprising a receiver 201, a processor 240, and a baseband processor 242. Another exemplary wireless communications terminal may be a wireless communications transceiver comprising a transmitter 200, a receiver 201, a processor 240, and a baseband processor 242.

Figure 3A:
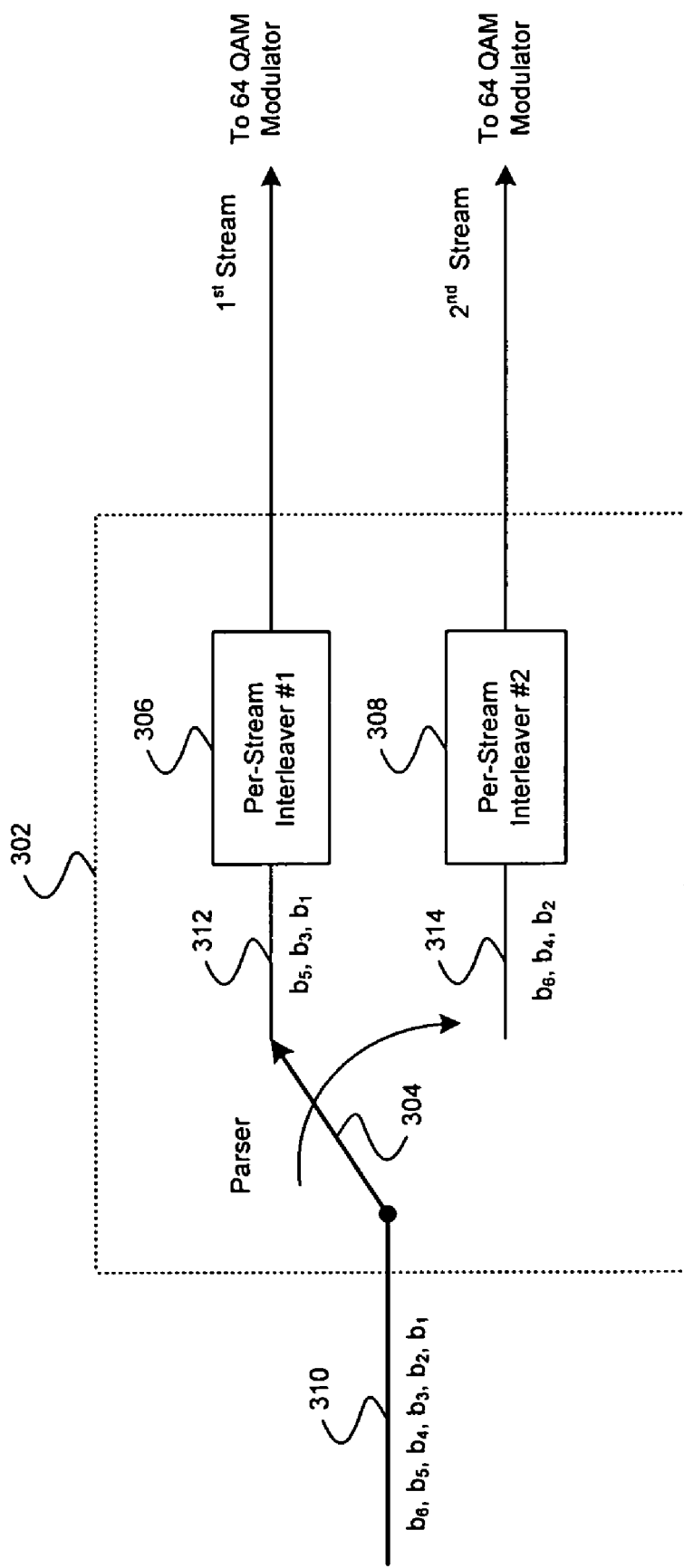
FIG. 3a. is a block diagram illustrating an interleaver structure, which may be utilized in connection with an embodiment of the invention.

FIG. 3a is a block diagram illustrating an interleaver structure, which may be utilized in connection with an embodiment of the invention. Referring to FIG. 3a there is shown an interleaver 302, a plurality of bits to be transmitted 310, a plurality of bits assigned to a first spatial stream 312, and a plurality of bits assigned to a second spatial stream 314. The interleaver 302 may comprise a parser 304, a first per-stream interleaver 306, and a second per-stream interleaver 308.

The parser 304 may comprise suitable logic, circuitry and/ or code that may be adapted to assign a binary bit of information, among a plurality of binary bits of information to be transmitted, to one of a plurality of spatial streams. The parser 304 may assign bits from the plurality of bits to be transmitted 310 to bits in a first spatial stream 312, and bits in a second spatial stream 314. The parser 304 may assign a number of bits to the first spatial stream 312, which is equal to a number of bits assigned to the second spatial stream 314.

The first per-stream interleaver 306 may be may comprise suitable logic circuitry and/or code that may be adapted to rearrange the order of bits in the first spatial stream 312, and to assign a bit from the bits in the first spatial stream 312 to one of a plurality of frequency carriers utilized for transmitting information carried in the first spatial stream via an RF channel. The second per-stream interleaver 308 may comprise suitable logic circuitry and/or code that may be adapted to rearrange the order of bits in the second spatial stream 314, and to assign a bit from the bits in the second spatial stream 314 to one of a plurality of frequency carriers utilized for transmitting information carried in the second spatial stream via an RF channel.

In operation the plurality of bits to be transmitted 310 may comprise, for example, bits $b_1$, $b_2$, $b_3$, $b_4$, $b_5$, and $b_6$. These bits may be parsed by the parser 304. The plurality of bits assigned to the first spatial stream 312 may comprise, for example, bits $b_1$, $b_3$, and $b_5$. The plurality of bits assigned to the second spatial stream 314 may comprise, for example, bits $b_2$, $b_4$, and $b_6$. In an embodiment of the invention with regard to the parser 304, a number of bits assigned to a current spatial stream may be equal to a number of bits assigned to a subsequent spatial stream. An output generated by the first per-stream interleaver 306 may comprise a first spatial stream. The first spatial stream may utilize a modulation type, for example, 64 level quadrature amplitude modulation (64 QAM). An output generated by the second per-stream interleaver 308 may comprise a second spatial stream. The second spatial stream may utilize a modulation type, for example, 64 QAM. In an embodiment of the interleaver 302, a first modulation type utilized for the first spatial stream may be equivalent to a second modulation type utilized by the second spatial stream.

In general, for a given plurality of coded bits before parsing by the parser 304, $b_{db}$, each bit may be denoted by an index, $k=0, 1, \ldots, b_{db}-1$. The parser 304 may assign bits to the first spatial stream, spatial stream 1, $b_{st}(1)$, for bit indexes $k=0, n_{st}, 2*n_{st}, \ldots, b_{db}-n_{st}$. The parser 304 may assign bits to spatial stream 2, $b_{st}(2)$, for bit indexes $k=1, n_{st}+1, 2*n_{st}+1, \ldots, b_{db}-n_{st}+1$. The parser 304 may assign bits to spatial stream 3, $b_{st}(3)$, for bit indexes $k=2, n_{st}+2, 2*n_{st}+2, \ldots, b_{db}-n_{st}+2$. The parser 304 may assign bits to spatial stream $n_{st}$, $b_{st}(n_{st})$, for bit indexes $k=n_{st}-1, 2*n_{st}-1, 3*n_{st}-1, \ldots, b_{db}-1$.

The pattern of bit assignments generated by an interleaver may be referred to as an "interleaver structure". Consecutive bits in the plurality of bits to be transmitted 310 may be assigned by the interleaver 302 to different spatial streams as described above. This interleaver structure may be referred to as a nonadaptive nonsequential interleaver structure. The nonadaptive nonsequential interleaver structure may provide improved performance, in relation to nonadaptive sequential interleaver structures that assign consecutive bits to the same spatial stream, as measured by criteria, for example, signal to noise ratio (SNR), or packet error rate (PER). The interleaver 302, however, may not be adapted to MIMO systems that utilize adaptive modulations.

Figure 3B:
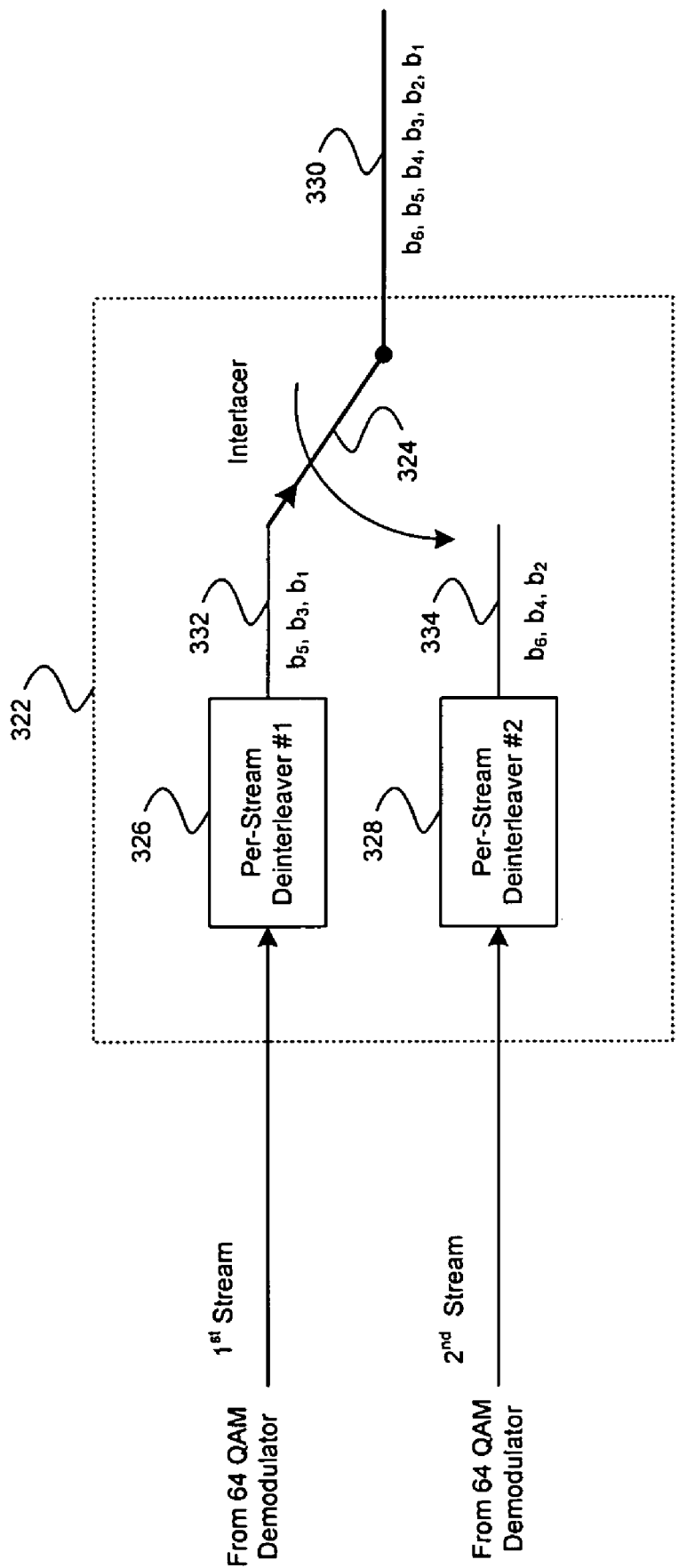
FIG. 3b is a block diagram illustrating a deinterleaver structure, which may be utilized in connection with an embodiment of the invention.

FIG. 3b is a block diagram illustrating a deinterleaver structure, which may be utilized in connection with an embodiment of the invention. Referring to FIG. 3b there is shown a deinterleaver 322, a plurality of to be received bits 330, a plurality of bits received in a first spatial stream 332, and a plurality of bits received in a second spatial stream 334. The deinterleaver 322 may comprise an interlacer 324, a first per-stream deinterleaver 326, and a second per-stream deinterleaver 328.

The interlacer 324 may comprise suitable logic, circuitry and/or code that may be adapted to retrieve a binary bit of information, among a plurality of received binary bits of information, from one of a plurality of spatial streams. The interlacer 324 may retrieve bits from the first spatial stream 332, and bits from the second spatial stream 334, and generate a plurality of received bits 330. The interlacer 324 may retrieve a number of bits to the first spatial stream 312, which is equal to a number of bits retrieved to the second spatial stream 314, when generating the plurality of received bits 330.

The first per-stream deinterleaver 326 may comprise suitable logic circuitry and/or code that may be adapted to rearrange the order of bits received in a plurality of frequency carriers utilized for transmitting information carried in the first spatial stream via an RF channel. The second per-stream deinterleaver 328 may comprise suitable logic circuitry and/or code that may be adapted to rearrange the order of bits received in a plurality of frequency carriers utilized for transmitting information carried in the second spatial stream via an RF channel.

In operation, the deinterleaver 322 in the receiver 201 may perform steps in reversed order when compared to steps performed by the corresponding interleaver 302 in the transmitter 200. The plurality of bits received from the first spatial stream 332 may comprise, for example, bits $b_1$, $b_3$, and $b_5$. The plurality of bits received from the second spatial stream 334 may comprise, for example, bits $b_2$, $b_4$, and $b_6$. The bits received from the first spatial stream 332, and the second spatial stream 334, may be combined by the interlacer 324 to generate the plurality of received bits 330. The plurality of received bits 330 may comprise, for example, bits $b_1$, $b_2$, $b_3$, $b_4$, $b_5$, and $b_6$. In an exemplary interlacer 324, a number of bits retrieved from a current spatial stream may be equal to a number of bits retrieved from a subsequent spatial stream. An input received by the first per-stream deinterleaver 326 may comprise a first spatial stream. The first spatial stream may utilize a modulation type, for example, 64 QAM. An input received by the second per-stream deinterleaver 328 may comprise a second spatial stream. The second spatial stream may utilize a modulation type, for example, 64 QAM. In an embodiment of the invention with regard to the deinterleaver 322, a first modulation type utilized for the first spatial stream may be equivalent to a second modulation type utilized by the second spatial stream.

In general, for a given plurality of received bits from an $i^{th}$ spatial stream, among a plurality of $n_{st}$ spatial streams, before interlacing by the interlacer 324, $b_{st}(i)$, each bit may be denoted by an index, $k_i=0, 1, \ldots, b_{db}/n_{st}-1$. For a given plurality of received bits after interlacing, $b_{db}$, each bit may be denoted by an index, $k=0, 1, \ldots, b_{db}-1$. The interlacer 324 may assign bits retrieved from the first spatial stream before interlacing, $b_{st}(1)$, for bit indexes $k_1=0, 1, \ldots, b_{db}/n_{st}-1$ to corresponding bits in the plurality of received bits after interlacing with corresponding bit indexes $k=0, n_{st}, 2*n_{st}, \ldots, b_{db}-n_{st}$. The interlacer 324 may assign bits retrieved from the second spatial stream before interlacing, $b_{st}(2)$, for bit indexes $k_2=0, 1, \ldots, b_{db}/n_{st}-1$ to corresponding bits in the plurality of received bits after interlacing with corresponding bit indexes $k=1, n_{st}+1, \ldots, b_{db}-n_{st}+1$. The interlacer 324 may assign bits retrieved from the third spatial stream before interlacing, $b_{st}(3)$, for bit indexes $k_3=0, 1, \ldots, b_{db}/n_{st}-1$ to corresponding bits in the plurality of received bits after interlacing with corresponding bit indexes $k=2, n_{st}+2, \ldots, b_{db}-n_{st}+2$. The interlacer 324 may assign bits retrieved from the spatial stream $n_{st}$ before interlacing, $b_{st}(n_{st})$, for bit indexes $k_{nst}=0, 1, \ldots, b_{db}/n_{st}-1$ to corresponding bits in the plurality of received bits after interlacing with corresponding bit indexes $k=n_{st}, 2*n_{st}, \ldots, b_{db}$.

Figure 4:
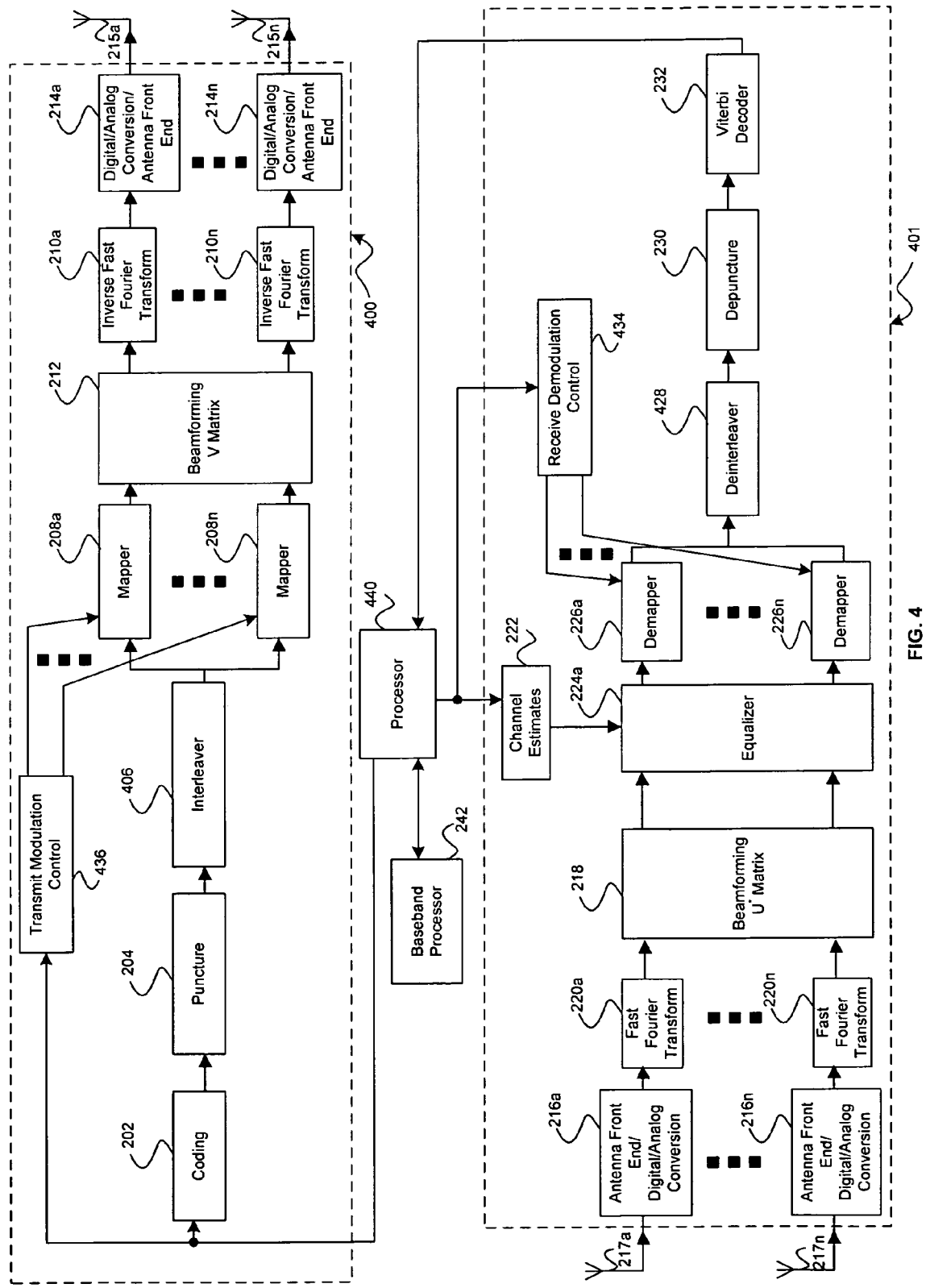
FIG. 4 is a block diagram of an exemplary transceiver comprising a transmitter and a receiver with adaptive modulation/demodulation for a MIMO system, which may be utilized in accordance with an embodiment of the invention.

FIG. 4 is a block diagram of an exemplary transceiver comprising a transmitter and a receiver with adaptive modulation/demodulation for a MIMO system, which may be utilized in accordance with an embodiment of the invention. With reference to FIG. 4 there is shown a transmitter 400, a receiver 401, a processor 440, a baseband processor 242, a plurality of transmitting antennas 215a, . . . ,215n, and a plurality of receiving antennas 217a, . . . , 217n. The transmitter 400 may comprise a transmit modulation control block 436, a coding block 202, a puncture block 204, an interleaver block 406, a plurality of mapper blocks 208a, . . . , 208n, a plurality of inverse fast Fourier transform (IFFT) blocks 210a, . . . , 210n, a beamforming V matrix block 212, and a plurality of digital to analog (D to A) conversion and antenna front end blocks 214a, . . . , 214n.

The receiver 401 may comprise a receive demodulation control block 434, a plurality of antenna front end and analog to digital (A to D) conversion blocks 216a, . . . , 216n, a beamforming U* matrix block 218, a plurality of fast Fourier transform (FFT) blocks 220a, . . . , 220n, a channel estimates block 222, an equalizer block 224, a plurality of demapper blocks 226a, . . . , 226n, a deinterleaver block 428, a depuncture block 230, and a Viterbi decoder block 232.

The interleaver block 406 may rearrange bits to be transmitted from the puncture block 204 and adaptively assign the bits to be transmitted to one of a plurality of spatial streams based on a modulation type. A number of bits adaptively assigned to one of a plurality of spatial streams by the interleaver block 406 may not be equal to a number of bits adaptively assigned to a subsequent one of the plurality of spatial streams. This may be referred to as an adaptive interleaver structure. The deinterleaver block 428 may rearrange received bits from the plurality of demapper blocks 226a . . .

226*n*, and combine the received bits to generate a received plurality of bits that comprise bits retrieved from a plurality of spatial streams.

The deinterleaver block 428 may rearrange received bits from the plurality of demapper blocks 226*a* . . . 226*n* in, for example, the reverse order of that utilized by the interleaver block 406 in the transmitter 400. A number of bits retrieved from one of a plurality of spatial streams by the deinterleaver block 428 may not be equal to a number of bits retrieved from a subsequent one of the plurality of spatial streams. The transmit modulation control block 436 may enable control over the selection of modulation techniques utilized in the transmitter 400. The receive demodulation control block 434 may enable control over the selection of demodulation techniques utilized in the receiver 401.

In operation, the transmit modulation control block 436 may enable control of modulation techniques applied by each of the plurality of mapper blocks 208*a*, . . . , 208*n* individually, on a per-stream basis. The receive demodulation control block 434 may enable control of demodulation techniques applied by each of the plurality of demapper blocks 226*a*, . . . , 226*n* individually, on a per-stream basis.

The processor 440 may perform digital receiver and/or transmitter functions in accordance with applicable communications standards. These functions may comprise, but are not limited to, tasks performed at lower layers in a relevant protocol reference model. These tasks may further comprise the physical layer convergence procedure (PLCP), physical medium dependent (PMD) functions, and associated layer management functions.

In operation, per-stream control of the mapper blocks 208*a*, . . . , 208*n* may control the number of bits assigned to one or more individual streams, $b_{s_t}(i)$, to ensure that the sum of bits across the plurality of streams equals an aggregate number of bits in the coding rate-adapted data block, $b_{db}$, as shown in equation[1]. The processor 440 may receive decoded data from the Viterbi decoder 232. The processor 440 may communicate received data to the baseband processor 242 for analysis and further processing. The processor 440 may also communicate data received via the RF channel, by the receiver 401, to the channel estimates block 222. This information may be utilized by the channel estimates block 222, in the receiver 401, to compute channel estimates for a received RF channel. The baseband processor 242 may generate data to be transmitted via an RF channel by the transmitter 400. The baseband processor 242 may communicate the data to the processor 440. The processor 440 may generate a plurality of bits that are communicated to the coding block 202. The processor 440 may generate signals to control operation of the transmit modulation control block 436, and of the receive demodulation control block 434.

The elements shown in FIG. 4 may comprise components that may be present in an exemplary wireless communications terminal. One exemplary wireless communications terminal may be a wireless communications transmitter comprising a transmitter 400, a processor 440, and a baseband processor 242. Another exemplary wireless communications terminal may be a wireless communications receiver comprising a receiver 401, a processor 440, and a baseband processor 242. Another exemplary wireless communications terminal may be a wireless communications transceiver comprising a transmitter 400, a receiver 401, a processor 440, and a baseband processor 242.

Figure 5:
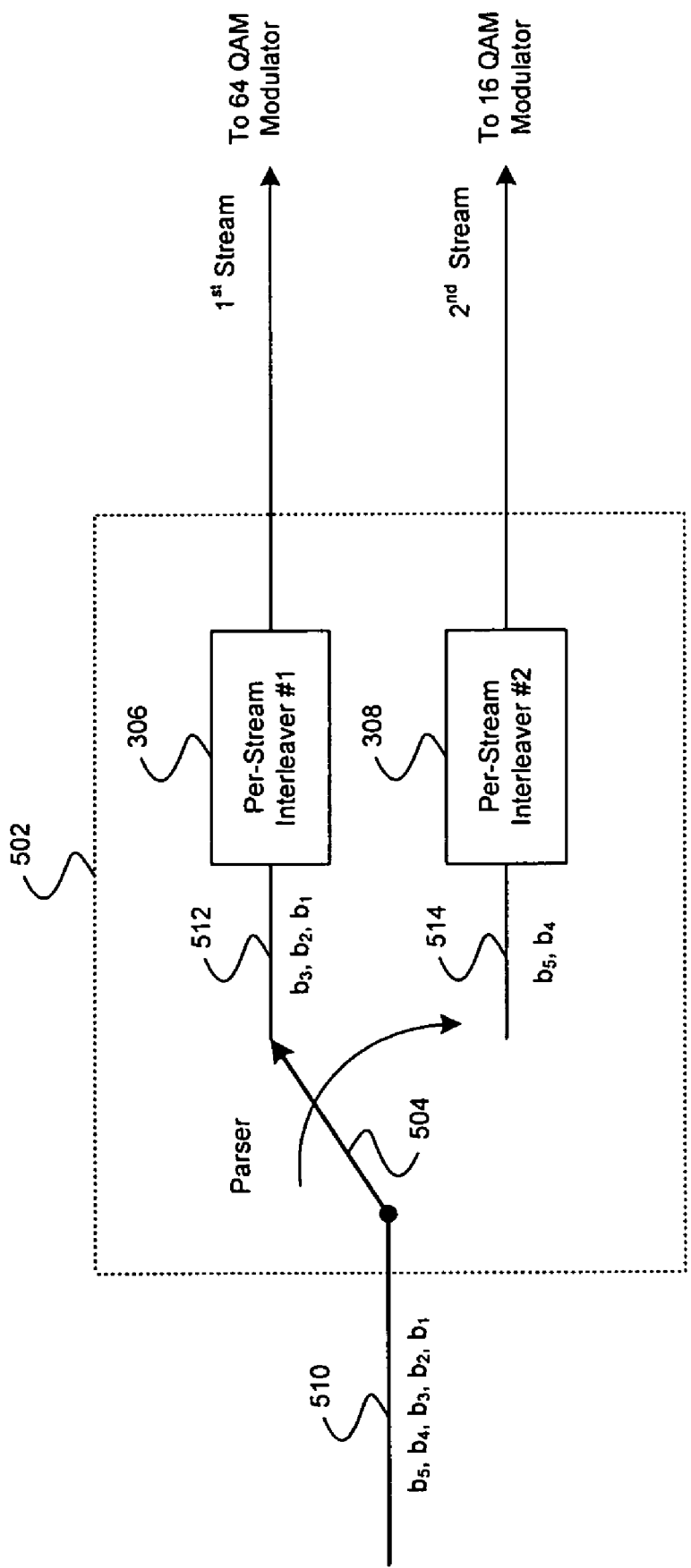
FIG. 5 is a block diagram illustrating an adaptive sequential interleaver structure, which may be utilized in connection with an embodiment of the invention.

FIG. 5 is a block diagram illustrating an adaptive sequential interleaver structure, which may be utilized in connection with an embodiment of the invention. Referring to FIG. 5 there is shown an interleaver 502, a plurality of bits to be transmitted 510, a plurality of bits assigned to a first spatial stream 512, and a plurality of bits assigned to a second spatial stream 514. The interleaver 502 may comprise a parser 504, a first per-stream interleaver 306, and a second per-stream interleaver 308.

The parser 504 may comprise suitable logic, circuitry and/or code that may be configured to adaptively assign at least one binary bit of information, among a plurality of binary bits of information to be transmitted, to one of a plurality of spatial streams. The parser 504 may adaptively assign bits from the plurality of bits to be transmitted 510 to bits in a first spatial stream 512, based on a modulation type utilized in the first spatial stream, and bits in a second spatial stream 514, based on the modulation type utilized in the second spatial stream. The parser 504 may assign a number of bits to the first spatial stream 512, which is not equal to a number of bits assigned to the second spatial stream 514.

In operation the plurality of bits to be transmitted 510 may comprise, for example, bits $b_1$, $b_2$, $b_3$, $b_4$, and $b_5$. These bits may be parsed by the parser 504. The parser 504 may parse the plurality of bits to be transmitted 510 based on the modulation type utilized in the first spatial stream, and on the modulation type utilized in the second spatial stream. The first spatial stream may utilize 64 QAM. The second spatial stream may utilize 16 level QAM (16 QAM). The plurality of bits adaptively assigned to the first spatial stream 512 may comprise, for example, bits $b_1$, $b_2$, and $b_3$. The plurality of bits adaptively assigned to the second spatial stream 514 may comprise, for example, bits $b_4$, and $b_5$. In an embodiment of the invention with regard to the parser 504, a number of bits adaptively assigned to a current spatial stream may not be equal to a number of bits adaptively assigned to a subsequent spatial stream. In an embodiment of the invention with regard to the interleaver 502, a first modulation type utilized for the first spatial stream may not be equivalent to a second modulation type utilized by the second spatial stream. Consecutive bits in the plurality of bits to be transmitted 510 may be assigned by the interleaver 502 to the same spatial stream as described above. The interleaver structure utilized by the interleaver 502 may be referred to as an adaptive sequential interleaver structure. The interleaver 502 may be adapted to MIMO systems that utilize adaptive modulations.

Figure 6A:
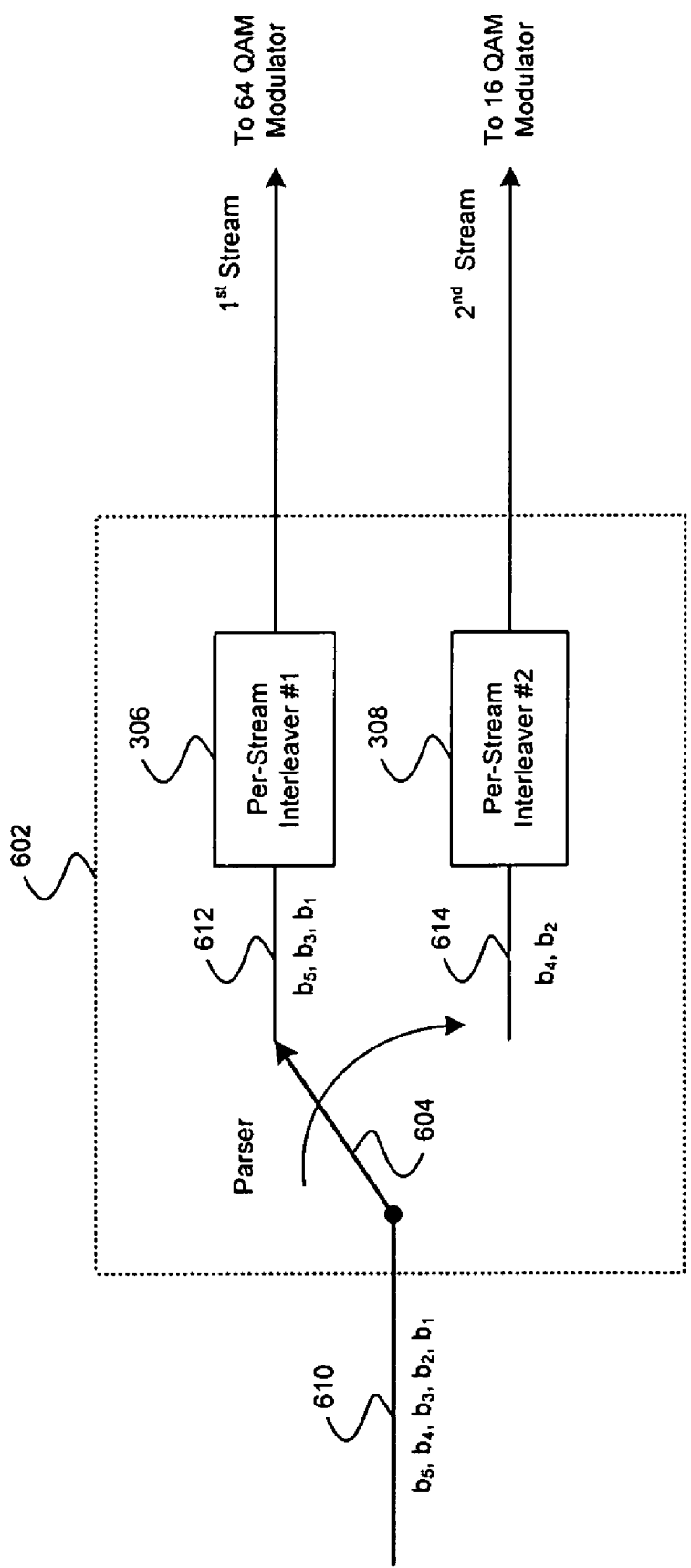
FIG. 6a is a block diagram illustrating an exemplary adaptive nonsequential interleaver structure, in accordance with an embodiment of the invention.

FIG. 6*a* is a block diagram illustrating an exemplary adaptive nonsequential interleaver structure, in accordance with an embodiment of the invention. Referring to FIG. 6*a*, there is shown an interleaver 602, a plurality of bits to be transmitted 610, a plurality of bits assigned to a first spatial stream 612, and a plurality of bits assigned to a second spatial stream 614. The interleaver 602 may comprise a parser 604, a first per-stream interleaver 306, and a second per-stream interleaver 308.

The parser 604 may comprise suitable logic, circuitry and/or code that may be configured to adaptively assign at least one binary bit of information, among a plurality of binary bits of information to be transmitted, to one of a plurality of spatial streams. The parser 604 may adaptively assign bits from the plurality of bits to be transmitted 610 to bits in a first spatial stream 612, based on a modulation type utilized in the first spatial stream, and bits in a second spatial stream 614, based on the modulation type utilized in the second spatial stream. The parser 604 may assign a number of bits to the first spatial stream 612, which is not equal to a number of bits assigned to the second spatial stream 614.

In operation the plurality of bits to be transmitted 610 may comprise, for example, bits $b_1$, $b_2$, $b_3$, $b_4$, and $b_5$. These bits may be parsed by the parser 604. The parser 604 may parse the plurality of bits to be transmitted 610 based on the modulation type utilized in the first spatial stream, and on the modulation type utilized in the second spatial stream. The first spatial stream may utilize 64 QAM and the second spatial stream may utilize 16 QAM, for example. The plurality of bits adaptively assigned to the first spatial stream 612 may comprise, for example, bits $b_1$, $b_3$, and $b_5$. The plurality of bits adaptively assigned to the second spatial stream 614 may comprise, for example, bits $b_2$, and $b_4$. In various embodiments of the invention, a number of bits adaptively assigned to a current spatial stream may not be equal to a number of bits adaptively assigned to a subsequent spatial stream. A first modulation type utilized for the first spatial stream may not be equivalent to a second modulation type utilized for the second spatial stream.

Consecutive bits in the plurality of bits to be transmitted 610 may be assigned by the interleaver 502 to different spatial streams as described above. The interleaver structure utilized by the interleaver 602 may be referred to as an adaptive nonsequential interleaver structure. The adaptive nonsequential interleaver structure may provide improved performance, in relation to adaptive or nonadaptive sequential interleaver structures that assign consecutive bits to the same spatial stream, as measured by criteria, for example, signal to noise ratio (SNR), or packet error rate (PER). The interleaver 602 may be adapted to MIMO systems that utilize adaptive modulations.

As described above, the interleaver 602 may assign a bit, $b_1$, from the plurality of binary bits to be transmitted 610 to the first spatial stream 612 based on the modulation type utilized for the first spatial stream, for example 64 QAM. The interleaver 602 may assign a subsequent bit, $b_2$, from the plurality of binary bits to be transmitted 610 to the second spatial stream 614 based on the modulation type utilized for the first spatial stream, for example 64 QAM, and/or the modulation type utilized in second spatial stream, for example 16 QAM. The interleaver 602 may assign a bit, $b_3$, from the plurality of binary bits to be transmitted 610 to the first spatial stream 612 based on the modulation type utilized for the first spatial stream, for example 64 QAM, and/or the modulation type utilized in a second spatial stream, for example 16 QAM. In various embodiments of the invention, among the 5 bits contained in the plurality of binary bits to be transmitted 610, the interleaver 602 may assign 3 bits to the first spatial stream 612, based on the modulation type utilized in the first spatial stream, and 2 bits to the second spatial stream 614, based on the modulation type utilized in the second spatial stream.

Figure 6B:
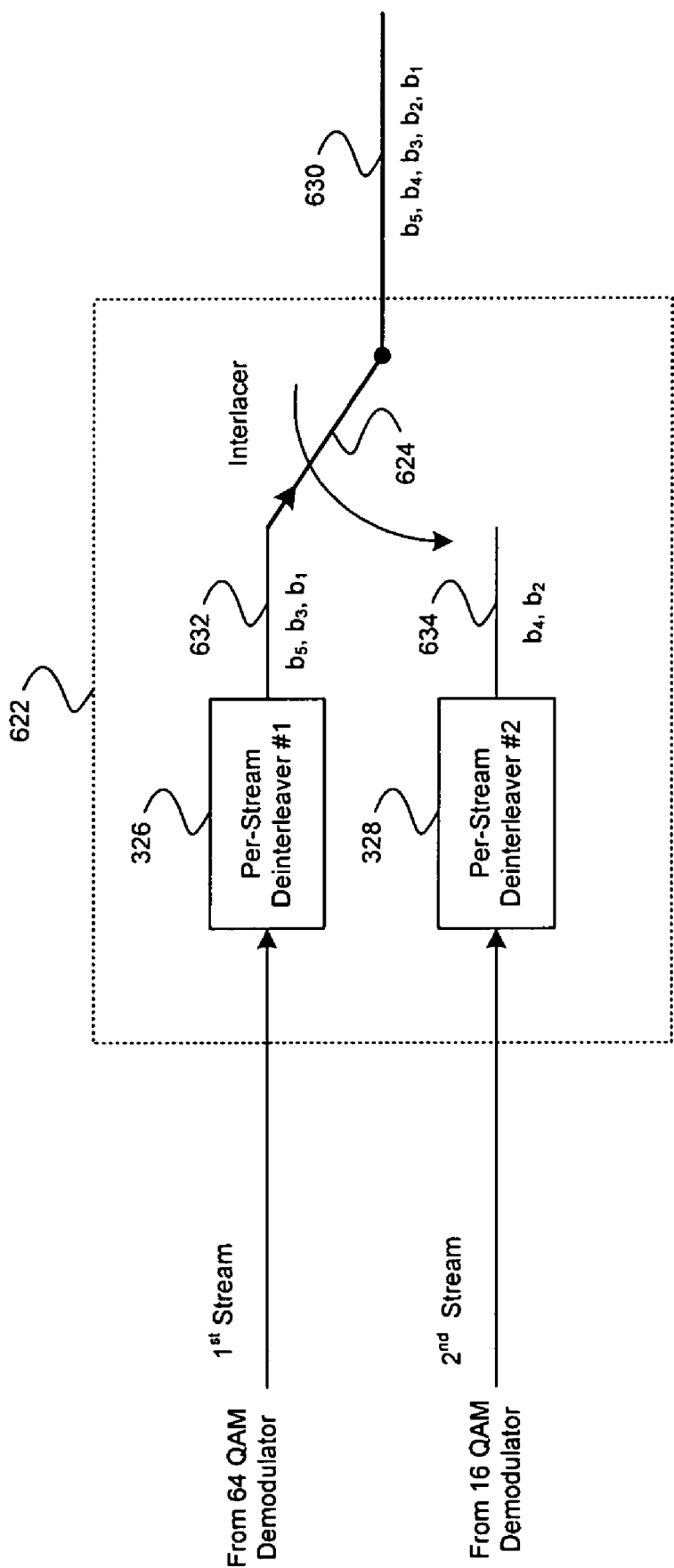
FIG. 6b is an exemplary block diagram illustrating an adaptive nonsequential deinterleaver structure, in accordance with an embodiment of the invention.

FIG. 6b is an exemplary block diagram illustrating an adaptive nonsequential deinterleaver structure, in accordance with an embodiment of the invention. Referring to FIG. 6b there is shown a deinterleaver 622, a plurality of to be received bits 630, a plurality of bits received in a first spatial stream 632, and a plurality of bits received in a second spatial stream 634. The deinterleaver 622 may comprise an interlacer 624, a first per-stream deinterleaver 326, and a second per-stream deinterleaver 328.

The interlacer 624 may comprise suitable logic, circuitry and/or code that may be adapted to retrieve a binary bit of information, among a plurality of received binary bits of information, from one of a plurality of spatial streams. The interlacer 624 may retrieve bits from the first spatial stream 632, and bits from the second spatial stream 634, and generate a plurality of received bits 630. The interlacer 624 may retrieve a number of bits from the first spatial stream 612, which is not equal to a number of bits retrieved from the second spatial stream 614, when generating the plurality of received bits 630.

In operation, the deinterleaver 622 in the receiver 401 may perform steps in a reversed order when compared to steps performed by the corresponding interleaver 602 in the transmitter 400. The first spatial stream may utilize a modulation type, for example, 64 QAM. The second spatial stream may utilize a modulation type, for example, 16 QAM. The plurality of bits adaptively retrieved from the first spatial stream 632 may comprise, for example, bits $b_1$, $b_3$, and $b_5$. The plurality of bits adaptively retrieved from the second spatial stream 634 may comprise, for example, bits $b_2$, and $b_4$. The bits retrieved from the first spatial stream 632, and the bits retrieved from the second spatial stream 634, may be combined by the interlacer 624 to generate the plurality of received bits 630. The plurality of received bits 630 may comprise, for example, bits $b_1$, $b_2$, $b_3$, $b_4$, and $b_5$. In various embodiments of the invention, a number of bits retrieved from a current spatial stream may not be equal to a number of bits retrieved from a subsequent spatial stream. A first modulation type utilized for the first spatial stream may not be equivalent to a second modulation type utilized by the second spatial stream.

Various embodiments of the invention may comprise a parser that utilizes an adaptive nonsequential intelearver structure that assigns consecutive bits, among a plurality of bits to be transmitted 610, to different spatial streams. Other parsers may utilize an adaptive nonsequential intelearver structure and assign the consecutive bits to the same spatial stream. For example, given a MIMO system that utilizes 4 spatial streams, and a plurality of bits to be transmitted comprising $(b_1,b_2,b_3,b_4,b_5,b_6,b_7,b_8,b_9)$, an adaptive sequential interleaver structure, may produce the following assignments:

bits $(b_1,b_2,b_3,b_4)$ to spatial stream 1
bits $(b_5,b_6)$ to spatial stream 2
bits $(b_7,b_8)$ to spatial stream 3
bit $(b_9)$ to spatial stream 4 where spatial stream 1 utilizes 256 quadrature amplitude modulation (QAM), spatial streams 2 and 3 utilize 16 QAM, and spatial stream 4 utilizes QAM.

By comparison, in the MIMO system given in the previous example, an adaptive nonsequential interleaver structure may produce the following assignments, for example:

bits $(b_1,b_5,b_6,b_9)$ to spatial stream 1
bits $(b_2,b_7)$ to spatial stream 2
bits $(b_3,b_8)$ to spatial stream 3
bit $(b_4)$ to spatial stream 4

The assignments produced by the adaptive sequential interleaver structure may be consecutively numbered within each spatial stream. For example, the first four bits, comprising bits $(b_1,b_2,b_3,b_4)$ from the plurality of bits to be transmitted comprising $(b_1,b_2,b_3,b_4,b_5,b_6,b_7,b_8,b_9)$, may be assigned to spatial stream 1. The subsequent two consecutive bits, comprising bits $(b_5,b_6)$ from the plurality of bits to be transmitted comprising $(b_1,b_2,b_3,b_4,b_5,b_6,b_7,b_8,b_9)$, may be assigned to spatial stream 2. The subsequent two consecutive bits, comprising bits $(b_7,b_8)$ from the plurality of bits to be transmitted comprising $(b_1,b_2,b_3,b_4,b_5,b_6,b_7,b_8,b_9)$, may be assigned to spatial stream 3. The subsequent bit, comprising bit $(b_9)$ from the plurality of bits to be transmitted comprising $(b_1,b_2,b_3,b_4, b_5,b_6,b_7,b_8,b_9)$, may be assigned to spatial stream 4.

By comparison, the assignments produced by the adaptive nonsequential interleaver structure may not be consecutively numbered within each spatial stream. For example, the bits, comprising bits $(b_1,b_5,b_6,b_9)$ from the plurality of bits to be transmitted comprising $(b_1,b_2,b_3,b_4,b_5,b_6,b_7,b_8,b_9)$, may be assigned to spatial stream 1. $(b_1,b_2,b_3,b_4,b_5,b_6,b_7,b_8,b_9)$, may be assigned to spatial stream 2. The bits, comprising bits ($b_3,b_8$) from the plurality of bits to be transmitted comprising ($b_1,b_2,b_3,b_4,b_5,b_6,b_7,b_8,b_9$), may be assigned to spatial stream 3. The bit, comprising bit ($b_4$) from the plurality of bits to be transmitted comprising ($b_1,b_2,b_3,b_4,b_5,b_6,b_7,b_8,b_9$), may be assigned to spatial stream 4.

By not assigning consecutive bits ($b_1,b_2,b_3,b_4$) to the same spatial stream, the adaptive nonsequential interleaver structure may improve the ability of a decoder 232 to recover the plurality of bits ($b_1,b_2,b_3,b_4,b_5,b_6,b_7,b_8,b_9$) transmitted by the transmitter 400 even if some of the bits were not received by the receiver 401. In this example, if a transmission error occurred that corrupted the 2 bits transmitted in the second spatial stream, a receiver 401 that received a plurality of spatial streams from a transmitter 400 utilizing the adaptive sequential interleaver structure may receive, for example:

bits ($b_1,b_2,b_3,b_4$) from spatial stream 1
bits ($X_5,X_6$) from spatial stream 2
bits ($b_7,b_8$) from spatial stream 3
bit ($b_9$) from spatial stream 4 where $X_n$ may indicate a bit n, among the plurality of bits to be transmitted, that has been corrupted during transmission between the transmitter 400 and the receiver 401.

The deinterleaver 622 may attempt to reconstruct the transmitted plurality of bits ($b_1,b_2,b_3,b_4,b_5,b_6,b_7,b_8,b_9$) based on the received bits. The deinterleaver 622 may generate a received plurality of bits ($b_1,b_2,b_3,b_4,X_5,X_6,b_7,b_8,b_9$), for example. The decoder 232 may be able to recover a bit lost during transmission, but the decoder 232 may not be able to recover a consecutive plurality of bits lost during transmission. For example, the decoder 232 may attempt to recover the lost bit $X_6$, but may be unable to do so if recovery of bit $X_6$ requires reception of bit $b_5$ by the receiver 401. As a result, a packet error may be detected at the receiver 401 for a received packet comprising bits $b_5$, and $b_6$. This, in turn, may result in an increased PER, and correspondingly, reduced throughput for communications between the transmitter 400 and the receiver 401.

In the case of the adaptive nonsequential interleaver structure, the decoder 232 may be able to recover the lost bits. For example, if a transmission error corrupted the 2 bits transmitted in the second spatial stream the deinterleaver 622 may attempt to reconstruct the transmitted plurality of bits ($b_1,b_2,b_3,b_4,b_5,b_6,b_7,b_8,b_9$) based on the received bits. The deinterleaver 622 may generate a received plurality of bits ($b_1,X_2,b_3,b_4,b_5,b_6,X_7,b_8,b_9$), for example. In this case, the decoder 232 may recover the lost bit $X_2$, and generate bit $b_2$, from received bit $b_1$, for example. The decoder 232 may recover the lost bit $X_7$, and generate bit $b_7$, from received bit $b_6$, for example.

By contrast, in the MIMO system given in the previous example, various embodiments of the invention may produce the following assignments, for example:

bits ($b_1,b_4,b_6,b_8$) to spatial stream 1
bits ($b_2,b_7$) to spatial stream 2
bits ($b_5,b_9$) to spatial stream 3
bit ($b_3$) to spatial stream 4

While the assignments produced by the adaptive nonsequential interleaver structure may not be consecutively numbered within each spatial stream, assignments to a spatial stream may comprise a plurality of consecutive bits. For example, while the bit assignments by the exemplary adaptive nonsequential interleaver, comprising bits ($b_1,b_5,b_6,b_9$) from the plurality of bits to be transmitted comprising ($b_1,b_2,b_3,b_4,b_5,b_6,b_7,b_8,b_9$), assigned to spatial stream 1, may not be sequentially numbered as a group, the assignments to the spatial stream 1 may contain sequential bits $b_5$, and $b_6$. Thus, if a transmission error occurred that corrupted the second and third bits transmitted in spatial stream 1, a receiver 401 that received a plurality of spatial streams from a transmitter 400 utilizing the adaptive nonsequential interleaver structure may receive, for example:

bits ($b_1,X_5,X_6,b_9$) to spatial stream 1
bits ($b_2,b_7$) to spatial stream 2
bits ($b_3,b_8$) to spatial stream 3
bit ($b_4$) to spatial stream 4

In this case, the deinterleaver 622 may generate a received plurality of bits ($b_1,b_2,b_3,b_4,X_5,X_6,b_7,b_8,b_9$). The decoder 232 may be unable to recover the lost bits $X_5,X_6$.

By contrast, in various embodiments of the invention, the decoder 232 may be able to recover the lost bits. If a transmission error corrupted the second and third bits transmitted in spatial stream 1, a receiver 401 that received a plurality of spatial streams from a transmitter 400 utilizing various embodiments of the invention may receive, for example:

bits ($b_1,X_4,X_6,b_8$) to spatial stream 1
bits ($b_2,b_7$) to spatial stream 2
bits ($b_5,b_9$) to spatial stream 3
bit ($b_3$) to spatial stream 4

In various embodiments of the invention, the deinterleaver 622 may attempt to reconstruct the transmitted plurality of bits ($b_1,b_2,b_3,b_4,b_5,b_6,b_7,b_8,b_9$) based on the received bits. The deinterleaver 622 may generate a received plurality of bits ($b_1,b_2,b_3,X_4,b_5,X_6,b_7,b_8,b_9$), for example. In this case, the decoder 232 may recover the lost bit $X_4$, and generate bit $b_4$, from received bit $b_3$, for example. The decoder 232 may recover the lost bit $X_6$, and generate bit $b_6$, from received bit $b_5$, for example.

In various embodiments of the invention, the interleaver 602 may assign the at least one binary bit of information, and/or the at least one subsequent binary bit of information based on a lookup table (LUT). The LUT may be stored in system memory 183. The interleaver 602 may organize the LUT utilizing a plurality of rows, and a plurality of columns. The LUT may comprise a matrix. At least one of the plurality of rows may correspond to a spatial stream number, and at least one of the plurality of columns may correspond to a spatial stream bit index. For example, a first row in the LUT may represent bits assigned to a first spatial stream. For example, a first column in the LUT may represent a first bit assigned to a spatial stream represented by a row in the LUT. One of the plurality of rows, and one of the plurality of columns may comprise an LUT element, where the element may comprise a component in a matrix. For example, a first row, and a first column may comprise a component in the LUT that represents a first bit assigned to a first spatial stream.

In another aspect of the invention, the interleaver 602 may number a plurality of the LUT elements based on the spatial stream number, and/or the spatial stream bit index. The interleaver 602 may assign at least one binary bit of information to one of the plurality of spatial streams based on this numbering. The interleaver 602 may compute a sum for the plurality of spatial streams based on a number of bits associated with a corresponding modulation type for at least one of the plurality of spatial streams. The interleaver 602 may compute a maximum value of a numbered element in an LUT based on a number that is proportional to the computed sum. The interleaver may assign a bit index to the at least one binary bit of information, and the at least one subsequent binary bit of information, among the plurality of binary bits of information to be transmitted. The bit index may be modulo numbered based on the computed maximum value. The at least one binary bit of information may be assigned to one of the plurality of spatial streams based on a correspondence between the bit index and the numbered element in the LUT.

A modulation type may be associated with a number of bits that may be encoded in a symbol that is generated utilizing the modulation type. The modulation type may be associated with one of a plurality of spatial streams. The number of bits associated with an $n^{th}$ spatial stream, b(n), may represent a number of bits associated with a corresponding modulation type for an $n^{th}$ spatial stream among a plurality of spatial streams. The number b(n) may also represent a number of bits per subcarrier ($NBPSC_n$) for the $n^{th}$ spatial stream that comprises a plurality of subcarriers. The total number of bits from the plurality of subcarriers in the $n^{th}$ spatial stream may represent the number of coded bits per orthogonal frequency division multiplexing symbol ($NCBPS_n$). The number $NCBPS_n$ may equal the number $NBPSC_n$ times the number of subcarriers associated with the $n^{th}$ spatial stream.

For example, for a spatial stream that utilizes 256 level QAM (256 QAM), the value of b(n) may be about 8. For example, for a spatial stream that utilizes 64 QAM, the value of b(n) may be about 6. For example, for a spatial stream that utilizes 16 QAM, the value of b(n) may be about 4. For example, for a spatial stream that utilizes QAM, the value of b(n) may be about 2. For b(n) greater or equal to 2, a sum, B, may be computed for a plurality of NSS spatial streams:

$$B = s_1 + s_2 + \ldots + s_{NSS} \qquad \text{equation[2]}$$

where $s_n$ may equal b(n)/2, and NSS may equal the number of spatial streams utilized in a communication between the transmitter 400, and the receiver 401. The sum, B, which may be proportional to the sum of spatial stream bits, b(n), among a plurality of spatial streams, may comprise a maximum value for a numbered element in the lookup table (LUT).

The LUT may comprise a matrix comprising a plurality of NSS rows, and $s_1$ columns, where $s_1$ may be greater than or equal to $s_n$ for values of n that are greater than 1. In general, $s_i$ may be greater than or equal to $s_j$ for values of j that are greater than i. A spatial stream number, snum, may correspond to a row in the LUT, and a spatial stream bit index, bnx, may correspond to a column in the LUT. The spatial stream number, snum, may correspond to a spatial stream n. The spatial stream bit index, bnx, may correspond to an index for bits assigned to a spatial stream. A value for snum, and a value for bnx may comprise an LUT numbered element that is a component in the LUT matrix. For example, snum=1, and bnx=1 may comprise a numbered element in the LUT that represents a first bit in a first spatial stream.

Various embodiments of the invention may comprise an interleaver 602 that assigns binary bits to be transmitted to at least one of a plurality of spatial streams by utilizing a procedure that comprises the following steps: a) selecting columns in at least one LUT from among the plurality of $s_1$ columns in at least one row among the plurality of NSS rows; b) numbering the selected columns; c) rearranging the numbered selected columns, and d) assigning binary bits to be transmitted via a plurality of spatial streams based on the rearranged numbered columns.

In an exemplary embodiment of the invention in which $s_1=4$ and $s_n$, for n greater than 1, is greater than or equal to 1, the LUT elements may be selected in accordance with the following procedure:

---

For $s_n = 4$:
   Select each column in row n from the LUT;
For $s_n = 3$:
   If b < 2:
     Select the first 3 columns in row n from the LUT;
   Else:
     Select the first 2 columns and the last column in row n from the LUT;
For $s_n = 2$:
   Select the first 2 columns in row n from the LUT that meet the condition:
     column mod(2) = (1 + $a_n$) mod(2);
For $s_n = 1$:
   Select the first columns in row n from the LUT that meet the condition:
     column mod(2) = (1 + $a_n$) mod(2);

--- where the spatial stream count variable b may be equal to a number of spatial streams among the plurality of NSS spatial streams for which $s_n=2$, and the spatial stream number variable n may be equal to one among a range of values 1, . . . , NSS. Furthermore, the spatial stream count variable an may be equal to a number of spatial streams among a portion of the plurality of NSS spatial streams j<n for which $s_j \leq 2$, and the expression x mod (2) may comprise a value equal to the base 2 modulus of a value x.

In this exemplary embodiment of the invention, LUT elements may be numbered in accordance with the following procedure:

For bnx=1:
     Consecutively number a $snum\_sel_1$ number of selected LUT elements, among a plurality of NSS LUT elements, in column 1 of the LUT, where the first selected element LUT(min(snum,1),1) is set equal 1 and the last selected LUT element in column 1 of the LUT is numbered $snum\_sel_1$;
   For bnx=2:
     Consecutively number a $snum\_sel_2$ number of selected LUT elements, among a plurality of NSS LUT elements, in column 2 of the LUT, where the first selected element LUT(min(snum,2),2) is set equal $snum\_sel_1+1$ and the last selected LUT element in column 2 of the LUT is numbered $snum\_sel_1+snum\_sel_2$;
   For bnx=3:
     Consecutively number a $snum\_sel_3$ number of selected LUT elements, among a plurality of NSS LUT elements, in column 3 of the LUT, where the first selected element LUT(min(snum,3),3) is set equal $snum\_sel_1+snum\_sel_2+1$ and the last selected LUT element in column 3 of the LUT is numbered $snum\_sel_1+snum\_sel_2+snum\_sel_3$;
   For bnx=4:
     Consecutively number a $snum\_sel_4$ number of selected LUT elements, among a plurality of NSS LUT elements, in column 4 of the LUT, where the first selected element LUT(min(snum,4),4) is set equal $snum\_sel_1+snum\_sel_2+snum\_sel_3+1$ and the last selected LUT element in column 2 of the LUT is numbered $snum\_sel_1+snum\_sel_2+snum\_sel_3+snum\_sel_4$;

where the column select count variable $snum\_sel_n$ may be equal to a number of selected LUT elements among a plurality of NSS LUT elements in column n of the LUT. The notation LUT(x,y) may refer to an LUT element identified by row x and column y. The spatial stream count variable snum may be equal to one among a range of values 1, ..., NSS. The expression min(snum,bnx) may comprise a lowest value snum for which there is a selected LUT element in column bnx in the LUT.

Elements in the LUT(x,y) generated by the above procedure may be rearranged such that, for each row in the LUT, the first $s_n$ number of elements comprise the first $s_n$ numbered elements in the row.

Individual bits among a plurality of binary bits of information to be transmitted may be denoted by an index, k=1, 2, ..., NBDB, where NBDB may represent a number of bits in a data block that are received by the interleaver block 406. The number NBDB may equal a sum of the number $NCBPS_n$ for at least a portion of the plurality of NSS spatial streams. Individual bits among a plurality of binary bits associated with an $n^{th}$ spatial stream may be denoted by an index, $k_n$=0, 1, ..., $NCBPS_n$-1.

In an exemplary embodiment of the invention, the interleaver 406 may assign at least one bit among a plurality of binary bits of information to be transmitted, and indexed by k, to a binary bit associated with an $n^{th}$ spatial stream, and indexed by $k_n$ based on the following equation:

$$k = LUT(n, k_n \bmod(s_n)+1) + \text{floor}(k_n/s_n)*\text{max\_LUT} \qquad \text{equation[3]}$$

where n may represent a number associated with a spatial stream, $k_n$ may represent an index for a bit associated with an $n^{th}$ spatial stream, $k_n \bmod(s_n)$ may represent the value of $k_n$ modulo $s_n$, and $s_n$ may be proportional to the number of bits associated with a modulation type. The notation floor(x) may represent an integer portion of the number x, and max_LUT may equal a maximum value for an element in the LUT. The value of max_LUT may equal B as represented in equation [2].

From the index k=1, 2, ..., NBDB that may be associated with individual bits among a plurality of binary bits of information to be transmitted, a modulo index k mod(B) may be generated and associated with the individual bits among the plurality of binary bits to be transmitted. Utilizing the modulo index k mod(B), the individual bits among the plurality of binary bits of information to be transmitted may be assigned to one of a plurality of a spatial streams by locating a corresponding value in a numbered element in the LUT.

FIG. 7a is a diagram illustrating generation of an exemplary lookup table comprising 3 spatial streams, in accordance with an embodiment of the invention. Referring to FIG. 7a there is shown a selection LUT 701, a numbered LUT 702, and a rearranged numbered LUT 703. FIG. 7a may be utilized to describe an exemplary MIMO system that utilizes 3 spatial streams. A modulation type utilized in spatial stream 1 may be 256 QAM, and a modulation type utilized in spatial streams 2 and 3 may be 16 QAM. The corresponding value of the modulation index $s_1$ is equal to 4 and the corresponding value of the modulation index $s_2$ is equal to 2. The corresponding value of the modulation index $s_3$ is equal to 2 and the corresponding value of spatial stream count variable b is equal to 2. The corresponding value of the spatial stream count variable $a_2$ is equal to 0 and the corresponding value of the spatial stream count variable $a_3$ is equal to 1. The LUTs 701, 702 and 703 may comprise 3 rows and 4 columns. The LUT 701 may represent selected LUT elements as indicated by X. Other LUT elements may not be selected. LUT 702 may represent numbered LUT elements from among the plurality of selected LUT elements from LUT 701. LUT 703 may represent numbered and rearranged LUT elements from among the plurality of numbered LUT elements from LUT 702. The LUT 703 may be utilized in conjunction with equation [3] to assign a binary bit from among a plurality of binary bits to be transmitted to at least one of a plurality of spatial streams.

FIG. 7b is a diagram illustrating generation of an exemplary lookup table comprising 4 spatial streams, in accordance with an embodiment of the invention. Referring to FIG. 7b there is shown a selection LUT 704, a numbered LUT 705, and a rearranged numbered LUT 706. FIG. 7b may be utilized to describe an exemplary MIMO system that utilizes 4 spatial streams. A modulation type utilized in spatial stream 1 may be 64 QAM and a modulation type utilized in spatial streams 2, 3 and 4 may be 16 QAM. The corresponding value of the modulation index $s_1$ is equal to 4 and the corresponding value of the modulation index $s_2$ is equal to 2. The corresponding value of the modulation index $s_3$ is equal to 2 and the corresponding value of the modulation index $s_4$ is equal to 2. The total number of selected LUT elements is equal to 9 and the corresponding value of spatial stream count variable b is equal to 3. The corresponding value of the spatial stream count variable $a_2$ is equal to 0 and the corresponding value of the spatial stream count variable $a_3$ is equal to 1. The corresponding value of the spatial stream count variable $a_4$ is equal to 2. The LUTs 704, 705 and 706 may comprise 4 rows and 4 columns, for example. The LUT 704 may represent selected LUT elements as indicated by X. Other LUT elements may not be selected. LUT 705 may represent numbered LUT elements from among the plurality of selected LUT elements from LUT 704. LUT 706 may represent numbered and rearranged LUT elements from among the plurality of numbered LUT elements from LUT 705. The LUT 706 may be utilized in conjunction with equation [3] to assign a binary bit from among a plurality of binary bits to be transmitted to at least one of a plurality of spatial streams.

In an exemplary embodiment of the invention in which $s_1$=4 and $s_n$, for n greater than 1, is greater than or equal to ½, an LUT may be generated that comprises a plurality of 2*B numbered elements. The dimensions of this LUT may be NSS (rows)×2*$s_1$ (columns). The $B_{odd}$+$B_{even}$ numbered elements may comprise an odd block, $LUT_{odd}$(x,y), comprising a plurality of $B_{odd}$ numbered elements further comprising dimensions of NSS×2*$s_1$, and an even block, $LUT_{even}$(x,y), comprising a plurality of $B_{even}$ numbered elements further comprising dimensions of NSS×2*$s_1$. $B_{odd}$ may represent the value for max_LUT for the odd block $LUT_{odd}$(x,y). $B_{even}$ may represent the value for max_LUT for the even block $LUT_{even}$(x,y). The elements in the odd block, $LU_{odd}$(x,y), and in the even block, $LUT_{even}$(x,y), may be numbered independently.

$B_{odd}$, and $B_{even}$ may be computed:

$$B_{odd} = \text{floor}(s_1+s_2+\ldots+s_{NSS}+0.5*c_{1/2}\bmod(2)) \qquad \text{equation[4]}$$

$$B_{even} = \text{floor}(s_1+s_2+\ldots+s_{NSS}) \qquad \text{equation[5]}$$

where the spatial stream count variable $c_{1/2}$ may represent a number of spatial streams among the plurality of NSS spatial streams for which $s_n$=½.

In an exemplary embodiment of the invention in which $s_1$=4 and $s_n$, for n greater than 1, is greater than or equal to ½, the LUT elements may be selected in accordance with the following procedure:

---

For $s_n$ = 4:
  Select each column in row n from $LUT_{odd}$ and $LUT_{even}$;
For $s_n$ = 3:
  If b < 2:
    Select the first 3 columns in row n from $LUT_{odd}$ and $LUT_{even}$;

-continued

```
Else:
    Select the first 2 columns and the last column in row n from
    LUT_odd and LUT_even;
For s_n = 2:
    Select the first 2 columns in row n from LUT_odd and LUT_even that meet
        the condition:
            column mod(2) = (1 + a_n) mod(2);
For s_n = 1:
    Select the first column in row n from LUT_odd and LUT_even that meets
        the condition:
            column mod(2) = (1 + a_n) mod(2);
For s_n = ½:
    If c_n is odd:
        Select the first column in row n from the LUT_odd;
    Else:
        Select the first column in row n from the LUT_even;
``` where the spatial stream count variable $c_n$ may be equal a number of spatial streams among a portion of the plurality of NSS spatial streams j<n for which $s_j=½$.

In this exemplary embodiment of the invention, LUT elements among $LUT_{odd}$ and $LUT_{even}$ may be numbered in accordance with the following procedure:

For bnx=1:
Consecutively number a $snum\_sel_1$ number of selected LUT elements, among a plurality of NSS LUT elements, in column 1 of the LUT, where the first selected element LUT(min(snum,1),1) is set equal 1 and the last selected LUT element in column 1 of the LUT is numbered $snum\_sel_1$;

For bnx=2:
Consecutively number a $snum\_sel_2$ number of selected LUT elements, among a plurality of NSS LUT elements, in column 2 of the LUT, where the first selected element LUT(min(snum,2),2) is set equal $snum\_sel_1+1$ and the last selected LUT element in column 2 of the LUT is numbered $snum\_sel_1+snum\_sel_2$;

For bnx=3:
Consecutively number a $snum\_sel_3$ number of selected LUT elements, among a plurality of NSS LUT elements, in column 3 of the LUT, where the first selected element LUT(min(snum,3),3) is set equal $snum\_sel_1+snum\_sel_2+1$ and the last selected LUT element in column 3 of the LUT is numbered $snum\_sel_1+snum\_sel_2+snum\_sel_3$;

For bnx=4:
Consecutively number a $snum\_sel_4$ number of selected LUT elements, among a plurality of NSS LUT elements, in column 4 of the LUT, where the first selected element LUT(min(snum,4),4) is set equal $snum\_sel_1+snum\_sel_2+snum\_sel_3+1$ and the last selected LUT element in column 2 of the LUT is numbered $snum\_sel_1+snum\_sel_2+snum\_sel_3+snum\_sel_4$;

The LUT for the exemplary case in which $s_1=4$ and $s_n$, for n greater than 1, is greater than or equal to ½, may be constructed by concatenating the odd block, $LUT_{odd}(x,y)$, and the even block, $LUT_{even}(x,y)$, such that, for each row in the LUT, the first $s_n$ number of elements comprise the first $s_n$ numbered elements in a corresponding row from the odd block, $LUT_{odd}(x,y)$, and next $s_n$ number of elements comprise the first $s_n$ numbered elements in a corresponding row from the even block, $LUT_{even}(x,y)$ after the maximum LUT numerical value, $B_{odd}$, has been added to each numbered element in the even block, $LUT_{even}(x,y)$.

In an exemplary embodiment of the invention for the case in which $s_1=4$ and $s_n$, for n greater than about 1, is greater than or equal to about ½, the interleaver 406 may assign at least one bit among a plurality of binary bits of information to be transmitted, and indexed by k, to a binary bit associated with an $n^{th}$ spatial stream, and indexed by $k_n$ based on the following equation:

$$k=LUT(n, k_n \bmod(2*s_n)+1)+\text{floor}(k_n/(2*s_n))*\max\_LUT \qquad \text{equation[6]}$$

where n may represent a number associated with a spatial stream, $k_n$ may represent an index for a bit associated with an $n^{th}$ spatial stream, $k_n \bmod(2*s_n)$ may represent the value of $k_n$ modulo $2*s_n$, and $s_n$ may be proportional to the number of bits associated with a modulation type. The notation floor(x) may represent an integer portion of the number x, and max_LUT may equal a maximum value for an element in the LUT. The value of max_LUT may equal B as represented in equation [2].

Figure 7C:
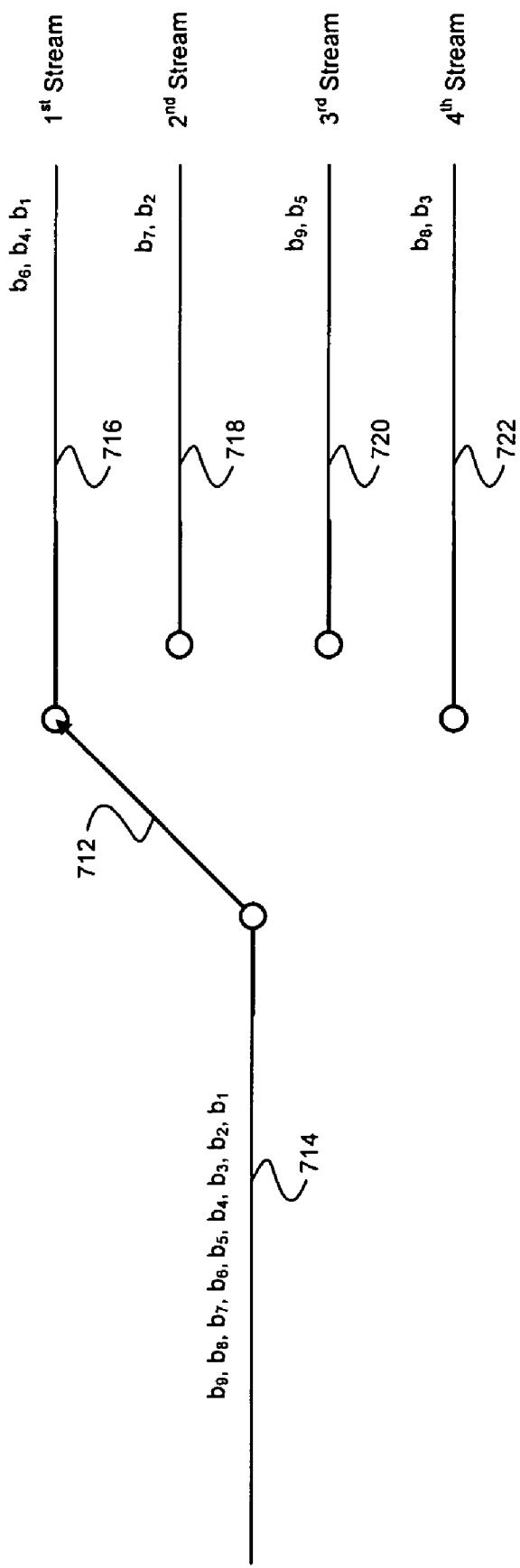
FIG. 7c is a block diagram illustrating an exemplary parser that utilizes the lookup table from FIG. 7b, in accordance with an embodiment of the invention.

FIG. 7c is a block diagram illustrating an exemplary parser that utilizes the lookup table from FIG. 7b, in accordance with an embodiment of the invention. Referring to FIG. 7b there is shown a parser 712, a plurality of bits to be transmitted 714, a plurality of bits assigned to a first spatial stream 716, a plurality of bits assigned to a second spatial stream 718, a plurality of bits assigned to a third spatial stream 720, and a plurality of bits assigned to a fourth spatial stream 722. The plurality of bits to be transmitted 714 may comprise bits $b_1$, $b_2$, $b_3$, $b_4$, $b_5$, $b_6$, $b_7$, $b_8$, and $b_9$. The parser 712 may utilize the LUT 706 to assign a plurality of bits to the first spatial stream 716 comprising bits $b_1$, $b_4$, and $b_6$. The parser 712 may utilize the LUT 706 to assign a plurality of bits to the second spatial stream 718 comprising bits $b_2$, and $b_7$. The parser 712 may utilize the LUT 706 to assign a plurality of bits to the third spatial stream 720 comprising bits $b_5$, and $b_9$. The parser 712 may utilize the LUT 706 to assign a bit to the fourth spatial stream 722 comprising bits $b_3$, and $b_8$.

In addition to utilizing the LUT 706, the parser 712 may utilize equation[6] to establish a corresponding relationship between a bit among the plurality of bits to be transmitted 714, and a bit in a spatial stream 716. The index for the third spatial stream, $k_3$ may comprise values 0 and 1. The correspondence between the second bit in the third spatial stream and a corresponding bit among the plurality of bits to be transmitted 714, may be determined utilizing equation[6]:

$$k=LUT(3,2) \qquad \text{equation[7]}$$

By reference to the LUT 706, the numbered element referred to by LUT(3,2) may be equal to 9, in this example. Thus, the $9^{th}$ bit from the plurality of bits to be transmitted 714 may be assigned to the second bit in the third spatial stream.

Various embodiments of the invention may not be limited to a specific interleaver structure. The lookup table (LUT) may define a method for defining a plurality of interleaver structures. In one aspect, the LUT may be utilized to define a nonadaptive nonsequential interleaver structure, or a nonadaptive sequential interleaver structure. In an exemplary nonadaptive sequential interleaver structure, an interleaver 602 may assign an equal number of bits to each of a plurality of spatial streams, and assign consecutive bits, from the plurality of bits of information to be transmitted, to the same spatial stream. In another aspect of the invention, the LUT may be utilized to define an adaptive nonsequential interleaver structure, or an adaptive sequential interleaver structure.

Various embodiments of the invention may not be limited to a specific deinterleaver structure. The lookup table (LUT) may define a method for defining a plurality of deinterleaver structures. In one aspect, the LUT may be utilized to define a nonadaptive nonsequential deinterleaver structure, or a nonadaptive sequential deinterleaver structure. In an exemplary nonadaptive sequential deinterleaver structure, a deinterleaver 622 may retrieve an equal number of bits from each of a plurality of spatial streams, and generate a received plurality of bits. The deinterleaver 622 may retrieve consecutive bits the same spatial stream. In another aspect of the invention, the LUT may be utilized to define an adaptive nonsequential deinterleaver structure, or an adaptive sequential deinterleaver structure.

Various embodiments of the invention may also not be limited to cases in which the number of bits associated with an $n^{th}$ spatial stream, b(n), is an even number. The procedures described above for generating an odd block, LUT(x,y), and an even block, LUT'(x,y), may also be utilized in conjunction to generate an LUT for cases in which b(n) is an odd number. Various embodiments of the invention may not be limited in the number of binary bits of information, b(n), that may be associated with a constellation type utilized in connection with a spatial stream.

Figure 8A:
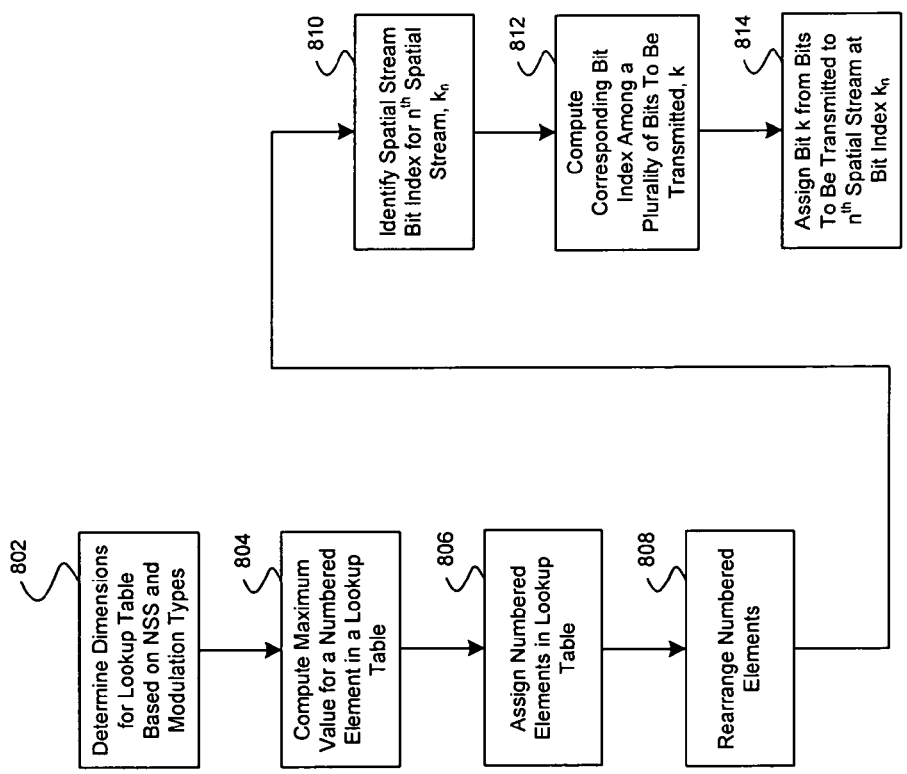
FIG. 8a is a flowchart illustrating exemplary steps for adaptive parsing of a plurality of bits in an interleaver, in accordance with an embodiment of the invention.

FIG. 8a is a flowchart illustrating exemplary steps for adaptive parsing of a plurality of bits in an interleaver, in accordance with an embodiment of the invention. With reference to FIG. 8a, step 802 may determine the dimensions of the lookup table (LUT) based on the number of spatial streams utilized, and the modulation types utilized during communication between a transmitter 400, and a receiver 401. Step 804 may compute a maximum value for a numbered element in the LUT. Step 806 may assign numbered elements in the LUT. Step 808 may rearrange numbered elements in the LUT to ensure that numbered elements are contiguous in the LUT. Step 810 may identify a spatial stream bit index for the $n^{th}$ spatial stream, $k_n$. Step 812 may compute a corresponding bit index among a plurality of bits to be transmitted, k. Step 814 may assign bit k from the bits to be transmitted to the $n^{th}$ spatial stream according to the bit index $k_n$.

Figure 8B:
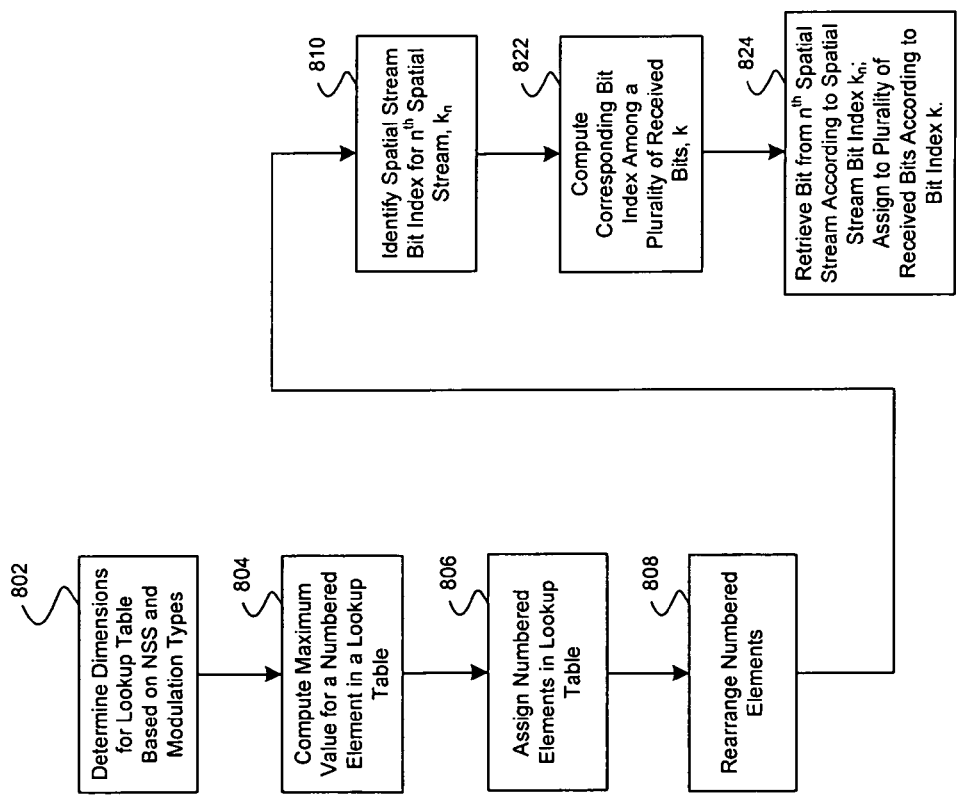
FIG. 8b is a flowchart illustrating exemplary steps for adaptive interlacing of a plurality of bits in a deinterleaver, in accordance with an embodiment of the invention.

FIG. 8b is a flowchart illustrating exemplary steps for adaptive interlacing of a plurality of bits in a deinterleaver, in accordance with an embodiment of the invention. With reference to FIG. 8b, steps 802-810 inclusive are substantially the same as in FIG. 8a. Step 802 may determine the dimensions of the lookup table (LUT) based on the number of spatial streams utilized, and the modulation types utilized during communication between the transmitter 400, and the receiver 401. Step 804 may compute a maximum value for a numbered element in the LUT. Step 806 may assign numbered elements in the LUT. Step 808 may rearrange numbered elements in the LUT to ensure that numbered elements are contiguous in the LUT. Step 810 may identify a spatial stream bit index for the $n^{th}$ spatial stream, $k_n$. Step 822 may compute a corresponding bit index among a plurality of received bits, k. Step 824 may retrieve a bit from the $n^{th}$ spatial stream according to the spatial stream bit index $k_n$, and assign the retrieved bit to the plurality of received bits according to the bit index, k.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing information in a communications system, the method comprising:
    selecting a set of look-up table (LUT) elements by an interleaver utilized in a multiple input multiple output (MIMO) wireless local area network (WLAN) system;
    rearranging by said interleaver, contents of said selected set of LUT elements in said lookup table; and
    assigning one or both of: at least one current binary bit of information and/or at least one subsequent binary bit of information, among a plurality of binary bits of information, to be transmitted wirelessly via at least one of a plurality of spatial streams, based on said rearranged selected set of LUT elements in said LUT.

2. The method according to claim 1, wherein said LUT comprises a number of rows equivalent to said plurality of spatial stream (NSS) utilized in said MIMO WLAN system.

3. The method according to claim 2, wherein said LUT comprises a number of columns $s_1$ equivalent to a maximum number of bits associated with a symbol transmitted via a carrier frequency associated with one of said plurality of spatial streams in said MIMO WLAN system.

4. The method according to claim 1, comprising selecting one or both of:
    LUT elements in a first 4 columns in a row of said LUT;
    LUT elements in a first 3 columns in a row of said LUT;
    LUT elements in a first 2 columns and a fourth column in a row of said LUT;
    LUT elements in a first column and a third column in a row of said LUT;
    LUT elements in a second column and a fourth column in a row of said LUT;
    an LUT element in a first column in a row of said LUT; and/or
    an LUT element in a second column in a row of said LUT.

5. The method according to claim 4, wherein a number of bits associated with a symbol transmitted via a carrier frequency associated with a current one of aid plurality of spatial streams is greater than or equal to a number of bits associated with a symbol transmitted via a carrier frequency associated with a subsequent one of said plurality of spatial streams.

6. The method according to claim 4, comprising selecting said selected at least one of said LUT elements in said first 4 columns in said row when a corresponding one of said plurality of spatial streams, utilizes a modulation type 256 quadrature amplitude modulation (QAM).

7. The method according to claim 4, comprising selecting said selected at least one of said LUT elements in one of: said first 3 columns, and said first 2 columns and said fourth column in said row, when a corresponding one of said plurality of spatial streams utilizes 64 QAM.

8. The method according to claim 7, comprising selecting said selected at least one of said LUT elements in said first 3 columns when less than 2 subsequent ones of said plurality of spatial streams associated with said LUT utilizes 16 QAM.

9. The method according to claim 7, comprising selecting said selected at least one of said LUT elements in said first 2 columns and said fourth column when not less than 2 subsequent ones of said plurality of spatial streams associated with said LUT utilizes 16 QAM.

10. The method according to claim 4, comprising selecting said selected at least one of said LUT elements in one of: said first column and said third column, and said second column and said fourth column in said row, when a corresponding one of said plurality of spatial streams utilizes 16 QAM.

11. The method according to claim 10, comprising selecting said selected at least one of said LUT elements in said first column and said third column when a number of preceding ones of said plurality of spatial streams associated with said LUT, for which a number of bits associated with a symbol transmitted via a carrier frequency associated with said preceding ones of said plurality spatial streams is not greater than 4, is an even integer.

12. The method according to claim 10, comprising selecting said selected at least one of said LUT elements in said second column and said fourth column when a number of preceding ones of said plurality of spatial streams associated with said LUT, for which a number of bits associated with a symbol transmitted via a carrier frequency associated with said preceding ones of said plurality spatial streams is not greater than 4, is an odd integer.

13. The method according to claim 4, comprising selecting said selected at least one of said LUT elements in one of: said first column and said second column in said row, when a corresponding one of said plurality of spatial streams, utilizes a modulation type QAM.

14. The method according to claim 13, comprising selecting said selected at least one of said LUT element in said first column when a number of preceding ones of said plurality of spatial streams associated with said LUT, for which a number of bits associated with a symbol transmitted via a carrier frequency associated with said preceding ones of said plurality of spatial streams is not greater than 4, is an even integer.

15. The method according to claim 13, comprising selecting said selected at least one of said LUT element in said second column and said fourth column when a number of preceding ones of said plurality of spatial streams associated with said LUT, for which a number of bits associated with a symbol transmitted via a carrier frequency associated with said preceding ones of said plurality of spatial streams is not greater than 4, is an odd integer.

16. A system for processing information in a communications system, the system comprising:
one or more circuits comprising an interleaver, said one or more circuits enable selection of a set of look-up table (LUT) elements for a multiple input multiple output (MIMO) wireless local area network (WLAN) system;
said one or more circuits enable rearranging of contents of said selected set of LUT elements in said lookup table; and
said one or more circuits enable assignment of one or both of: at least one current binary bit of information and/or at least one subsequent binary bit of information, among a plurality of binary bits of information, to be transmitted wirelessly via at least one of a plurality of spatial streams, based on said rearranged selected set of LUT elements in said LUT.

17. The system according to claim 16, wherein said LUT comprises a number of rows equivalent to said plurality of spatial stream (NSS) utilized in said MIMO WLAN system.

18. The system according to claim 17, wherein said LUT comprises a number of columns $s_1$ equivalent to a maximum number of bits associated with a symbol transmitted via a carrier frequency associated with one of said plurality of spatial streams in said MIMO WLAN system.

19. The system according to claim 16, wherein said one or more circuits enable selection of one or more of:
LUT elements in a first 4 columns in a row of said LUT;
LUT elements in a first 3 columns in a row of said LUT;
LUT elements in a first 2 columns and a fourth column in a row of said LUT;
LUT elements in a first column and a third column in a row of said LUT;
LUT elements in a second column and a fourth column in a row of said LUT;
an LUT element in a first column in a row of said LUT; and/or
an LUT element in a second column in a row of said LUT.

20. The system according to claim 19, wherein a number of bits associated with a symbol transmitted via a carrier frequency associated with a current one of said plurality of spatial streams is greater than or equal to a number of bits associated with a symbol transmitted via a carrier frequency associated with a subsequent one of said plurality of spatial streams.

21. The system according to claim 19, wherein said one or more circuits enable selection of said selected at least one of said LUT elements in said first 4 columns in said row when a corresponding one of said plurality of spatial streams, utilizes a modulation type 256 quadrature amplitude modulation (QAM).

22. The system according to claim 19, wherein said one or more circuits enable selection of said selected at least one of said LUT elements in one of: said first 3 columns, and said first 2 columns and said fourth column in said row, when a corresponding one of said plurality of spatial streams utilizes 64 QAM.

23. The system according to claim 22, wherein said one or more circuits enable selection of said selected at least one of said LUT elements in said first 3 columns when less than 2 subsequent ones of said plurality of spatial streams associated with said LUT utilizes 16 QAM.

24. The system according to claim 22, wherein said one or more circuits enable selection of said selected at least one of said LUT elements in said first 2 columns and said fourth column when not less than 2 subsequent ones of said plurality of spatial streams associated with said LUT utilizes 16 QAM.

25. The system according to claim 19, wherein said one or more circuits enable selection of said selected at least one of said LUT elements in one of: said first column and said third column, and said second column and said fourth column in said row, when a corresponding one of said plurality of spatial streams utilizes 16 QAM.

26. The system according to claim 25, wherein said one or more circuits enable selection of said selected at least one of said LUT elements in said first column and said third column when a number of preceding ones of said plurality of spatial streams associated with said LUT, for which a number of bits associated with a symbol transmitted via a carrier frequency associated with said preceding ones of said plurality spatial streams is not greater than 4, is an even integer.

27. The system according to claim 25, wherein said one or more circuits enable selection of said selected at least one of said LUT elements in said second column and said fourth column when a number of preceding ones of said plurality of spatial streams associated with said LUT, for which a number of bits associated with a symbol transmitted via a carrier frequency associated with said preceding ones of said plurality spatial streams is not greater than 4, is an odd integer.

28. The system according to claim 19, wherein said one or more circuits enable selection of said selected at least one of said LUT elements in one of: said first column and said second column in said row, when a corresponding one of said plurality of spatial streams, utilizes a modulation type QAM.

29. The system according to claim 28, wherein said one or more circuits enable selection of said selected at least one of said LUT element in said first column when a number of preceding ones of said plurality of spatial streams associated with said LUT, for which a number of bits associated with a symbol transmitted via a carrier frequency associated with said preceding ones of said plurality of spatial streams is not greater than 4, is an even integer.

30. The system according to claim 28, wherein said one or more circuits enable selection of said selected at least one of said LUT element in said second column and said fourth column when a number of preceding ones of said plurality of spatial streams associated with said LUT, for which a number of bits associated with a symbol transmitted via a carrier frequency associated with said preceding ones of said plurality of spatial streams is not greater than 4, is an odd integer.

* * * * *

UNITED STATES PATENT AND TRADEMARK OFFICE
CERTIFICATE OF CORRECTION

PATENT NO. : 7,630,350 B2 Page 1 of 1
APPLICATION NO. : 11/183018
DATED : December 8, 2009
INVENTOR(S) : Joonsuk Kim It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1068 days.

Signed and Sealed this

Second Day of November, 2010

David J. Kappos
*Director of the United States Patent and Trademark Office*